United States Patent [19]

Noble

[11] 4,442,974
[45] Apr. 17, 1984

[54] LAND IRRIGATION SYSTEM AND METHOD

[75] Inventor: Allen T. Noble, Boise, Id.

[73] Assignee: Noble Linear Irrigation, Inc., Boise, Id.

[21] Appl. No.: 116,874

[22] Filed: Jan. 30, 1980

Related U.S. Application Data

[63] Continuation-in-part of Ser. No. 18,013, Mar. 6, 1979, abandoned, which is a continuation-in-part of Ser. No. 923,291, Jul. 10, 1978, abandoned, which is a continuation-in-part of Ser. No. 887,792, Mar. 17, 1978, abandoned.

[51] Int. Cl.³ .................................... B05B 3/18
[52] U.S. Cl. .................... 239/1; 137/614.02; 137/614.06; 239/183; 239/184; 239/711; 239/721
[58] Field of Search ............... 239/178, 1, 183, 184, 239/711, 719, 720, 721; 137/614.02, 614.06, 615; 285/DIG. 25

[56] References Cited

U.S. PATENT DOCUMENTS

| | | | |
|---|---|---|---|
| 3,444,941 | 5/1969 | Purtell | 239/183 |
| 3,680,591 | 8/1972 | Vik | 137/614.06 |
| 3,729,016 | 4/1973 | Von Linslowe | 239/711 |
| 3,902,668 | 9/1975 | Daugherty | 239/184 |
| 3,970,102 | 7/1976 | Harvey | 239/183 |
| 4,159,080 | 6/1979 | Standal | 239/183 |

FOREIGN PATENT DOCUMENTS

| | | | |
|---|---|---|---|
| 434918 | 11/1974 | U.S.S.R. | 239/183 |
| 727181 | 4/1980 | U.S.S.R. | 239/183 |

Primary Examiner—Robert B. Reeves
Assistant Examiner—Michael J. Forman
Attorney, Agent, or Firm—Shanley, O'Neil & Baker

[57] ABSTRACT

A land irrigation system in which a continuously traveling sprinkler line is supplied with water from a stationary water supply conduit extending in the direction of the movement of the sprinkler line, the apparatus of the invention being designed to continuously supply water to the sprinkler from spaced risers forming part of the water supply conduit. A conveyance moves along the water supply conduit, the conveyance carrying a rotating water manifold with a plurality of water carrying arms extending from the water manifold in angularly spaced relation to each other for successive connection to water outlet valves on the risers as the conveyance moves along the water supply conduit. The water outlet from the water manifold is connected to the water inlet of the sprinkler line in such a manner that the water manifold and water carrying arms can rotate relative to the inlet of the sprinkler line. The water inlet end of each water carrying arm couples with successive outlet valves of successive risers for opening and closing the riser water outlet valves and in each case the coupled water carrying arm is uncoupled from one riser when another water carrying arm has coupled with another riser and opened the water outlet valve of that riser. With one coupling member connected to one riser, power assist means and/or movement of the conveyance along the water supply conduit can be utilized to cause the water manifold and water carrying arms to rotate around the connected riser and also relative to the conveyance to bring another coupling member into contiguity with the next riser in the direction of conveyance travel. Provision is made, which can include power means for moving the water manifold away from and toward the stationary water supply conduit to accommodate the length of the coupled water carrying arm as it rotates around the connected riser. A method of continuously supplying water to a traveling sprinkler line is also disclosed.

30 Claims, 19 Drawing Figures

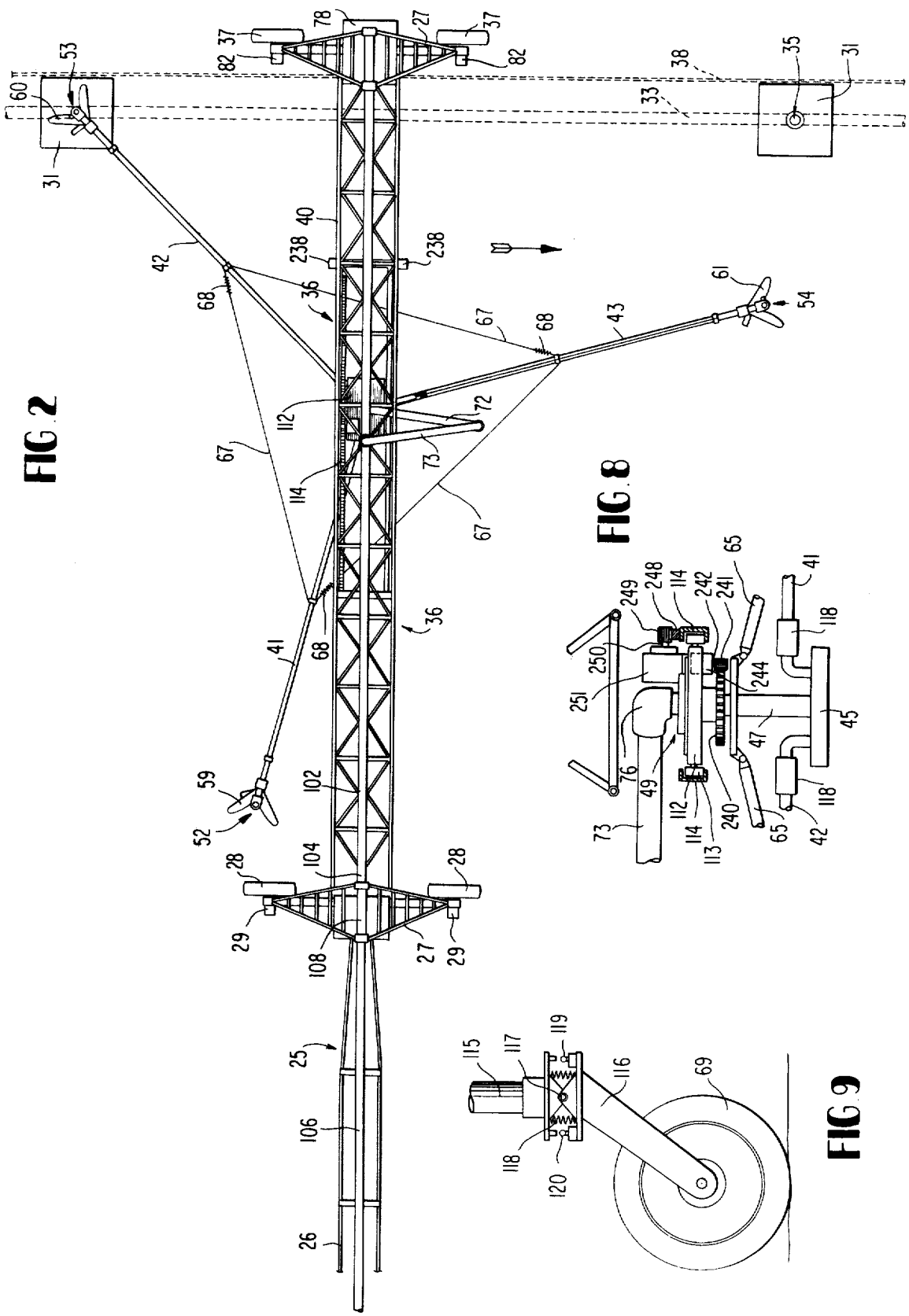

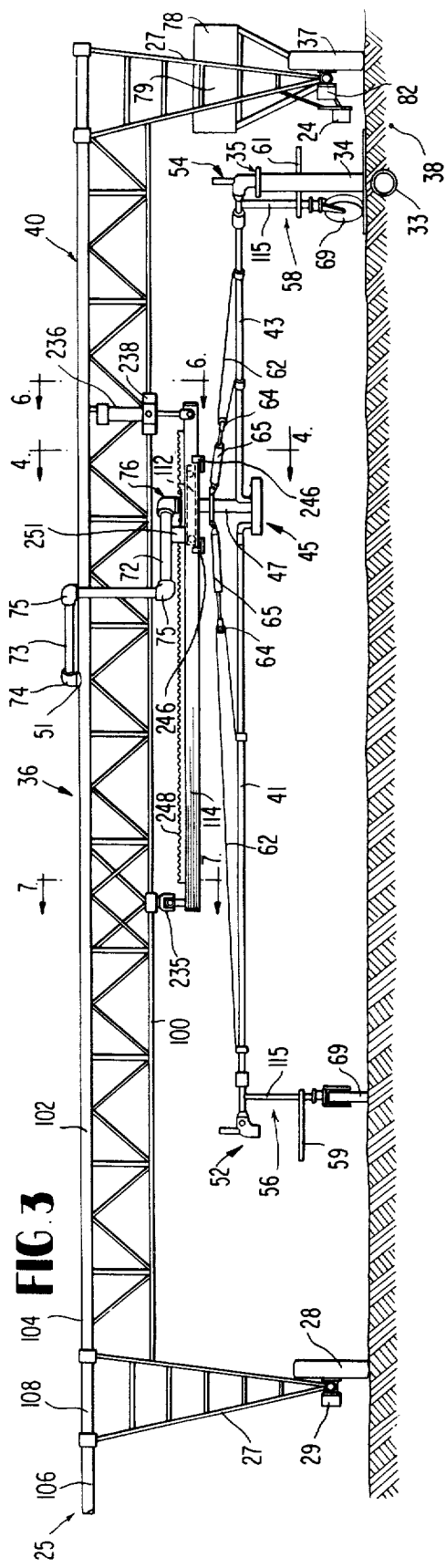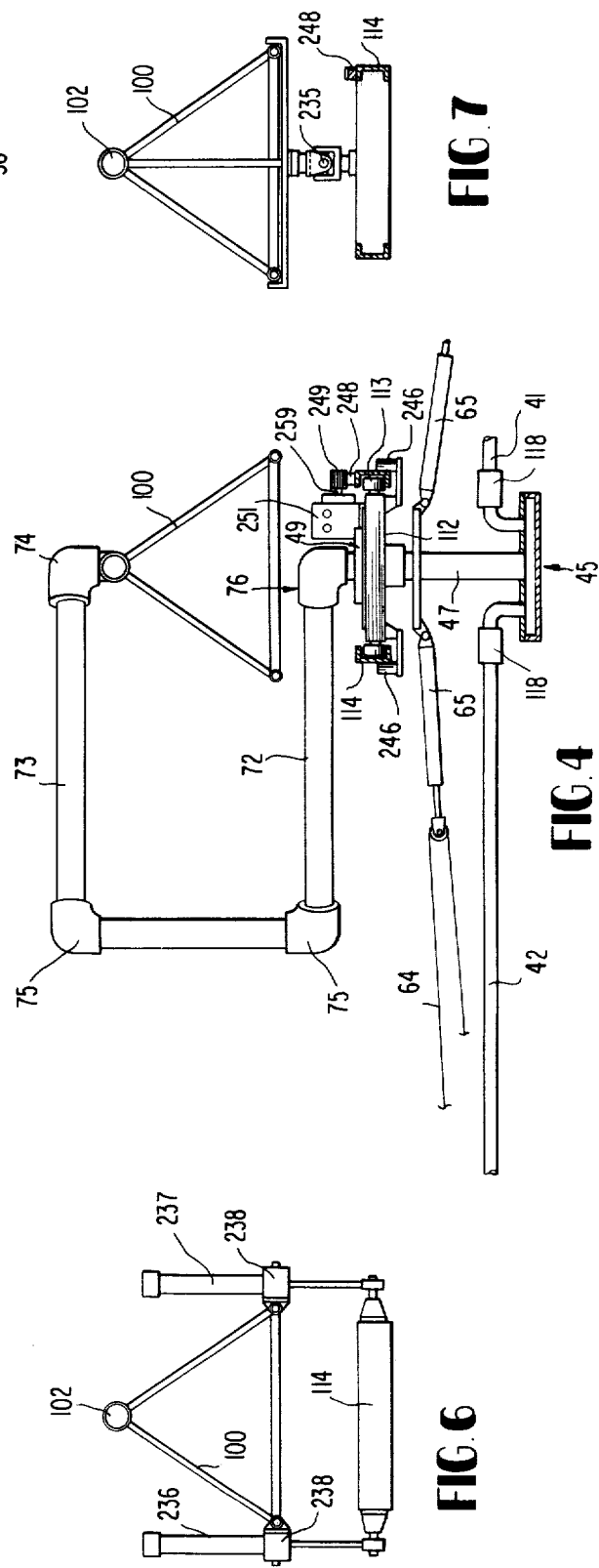

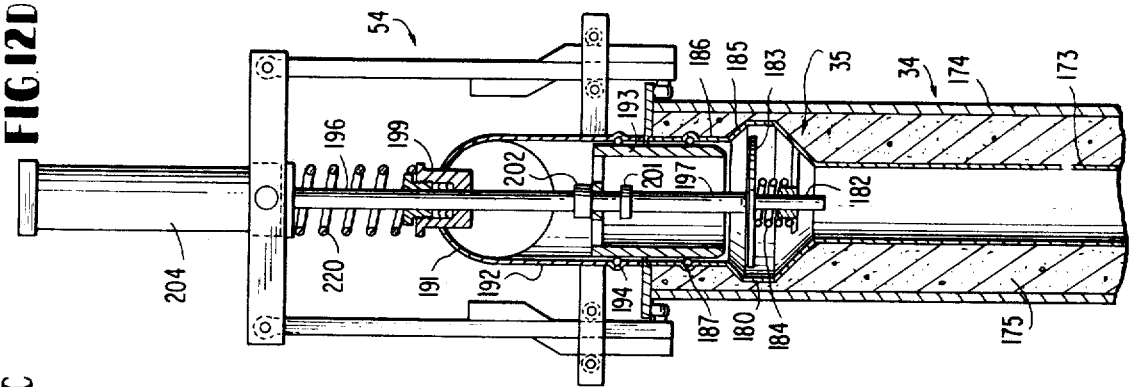
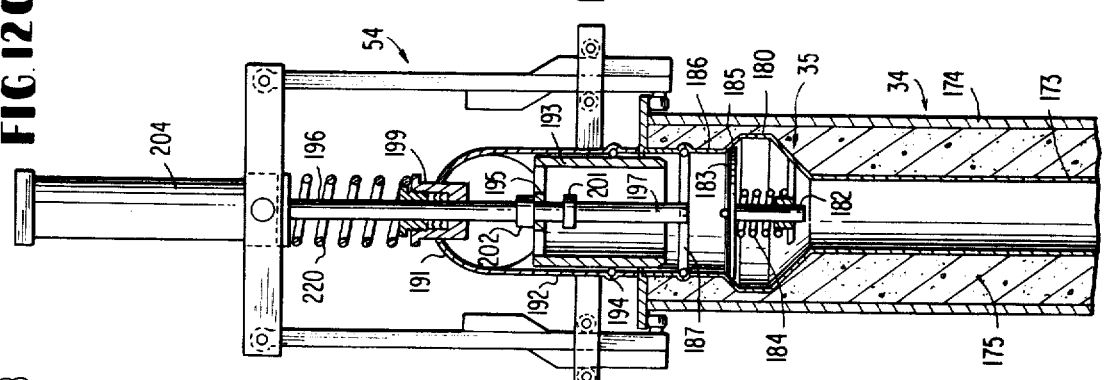
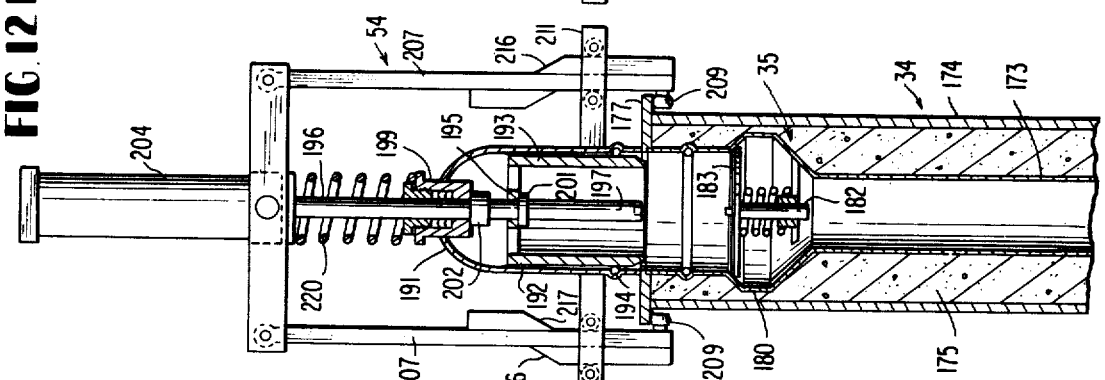
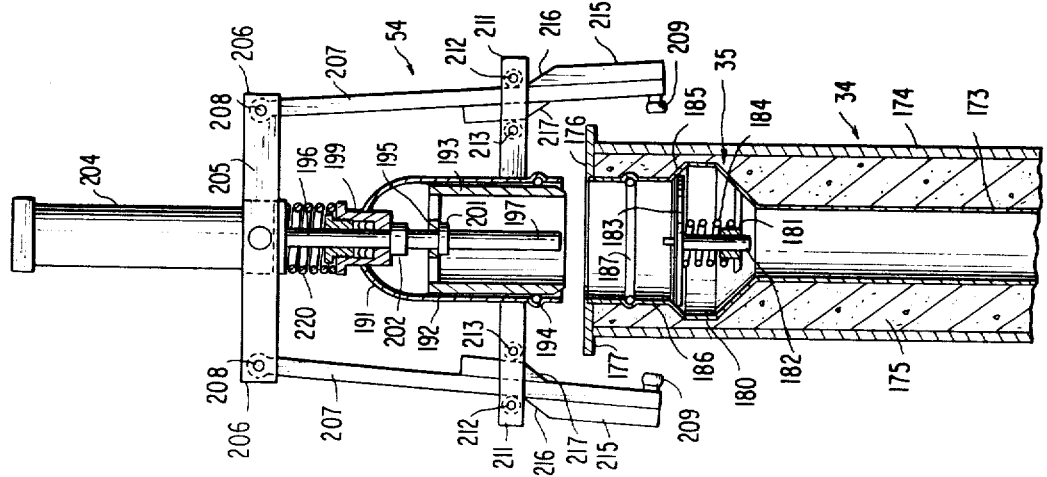

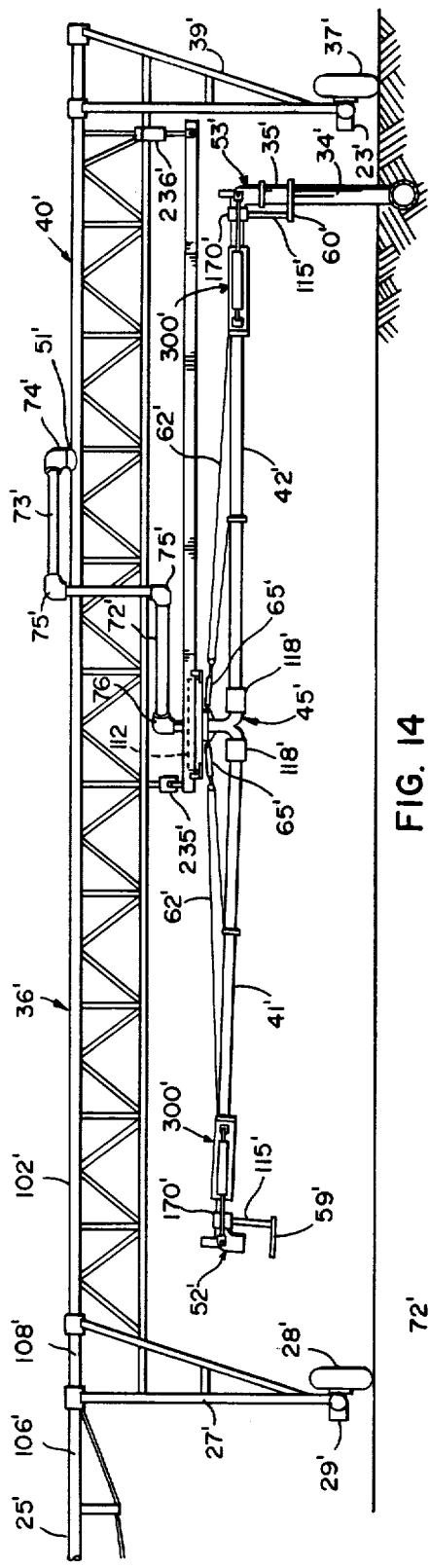
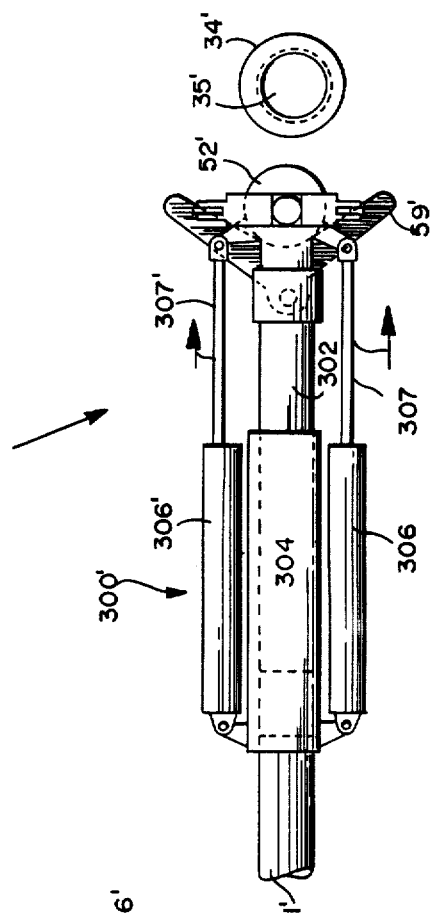
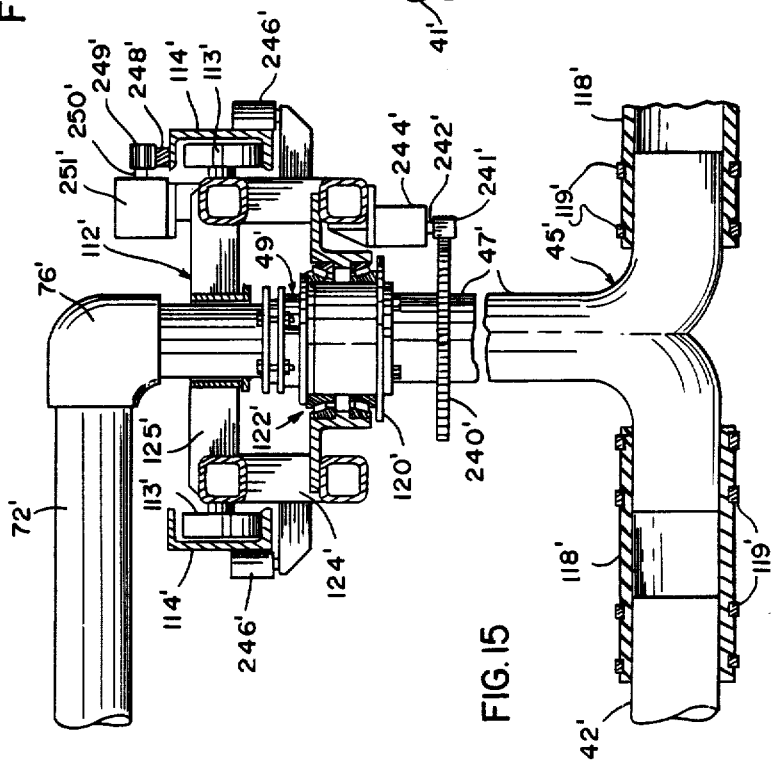
FIG. 14
FIG. 16
FIG. 15

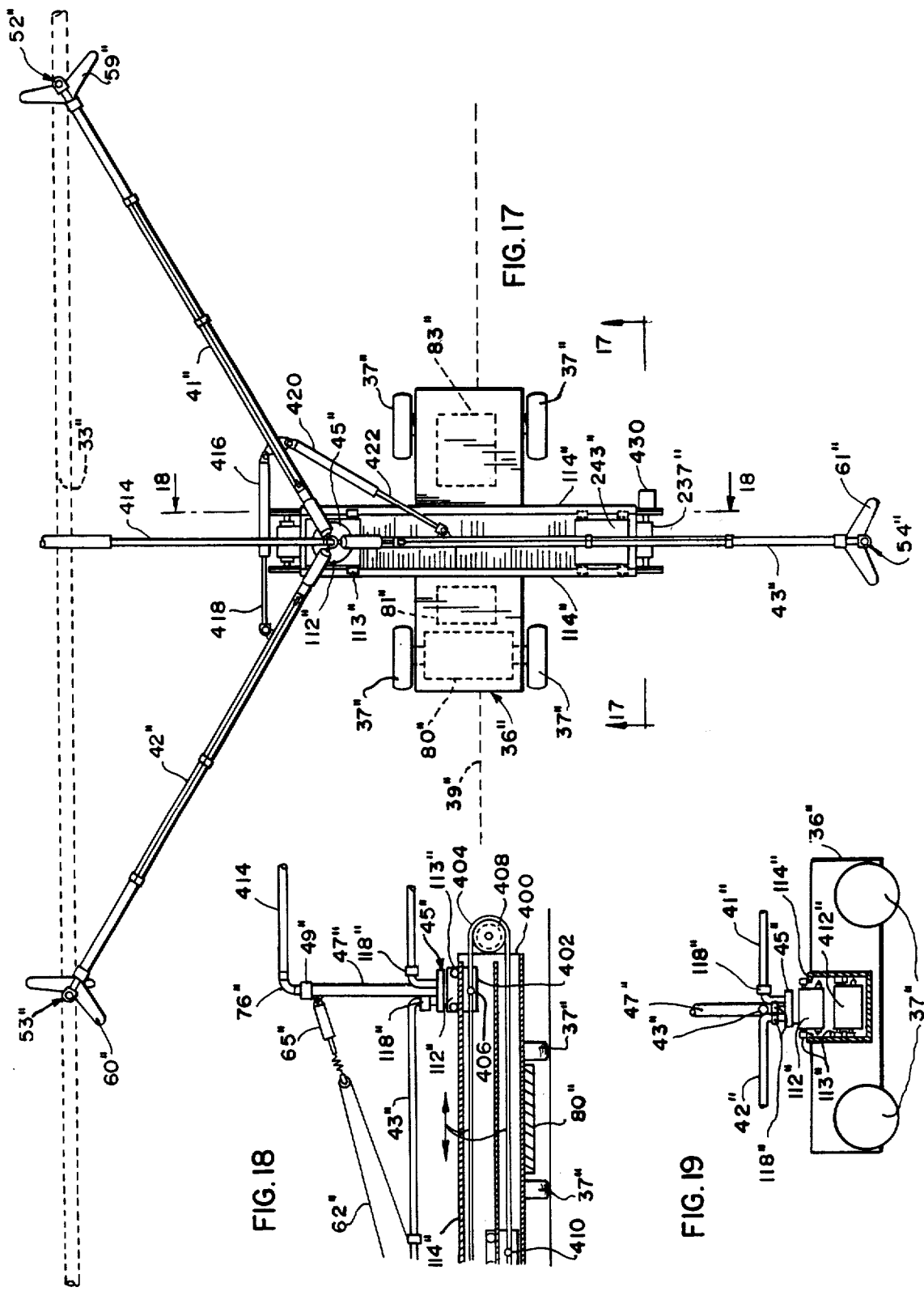

LAND IRRIGATION SYSTEM AND METHOD

RELATED APPLICATIONS

This application is a continuation-in-part application of U.S. patent application Ser. No. 18,013 filed Mar. 6, 1979, now abandoned, which in turn is a continuation-in-part application of U.S. patent application Ser. No. 923,291, filed July 10, 1978, now abandoned, which in turn is a continuation-in-part application of U.S. patent application Ser. No. 887,792 filed Mar. 17, 1978, now abandoned.

BACKGROUND OF THE INVENTION

When irrigating extensive areas of land, long sprinkler lines have been used for some time. Water has been supplied to these lines from buried pipes called main lines with spaced risers projecting above the surface of the ground for connection to the sprinkler lines. Each time a sprinkler line had to be moved to a new riser, a manual labor was required for this purpose. This was a laborious and time consuming operation. As time went on, the sprinkler lines, which can reach a length of a quarter of a mile and more were fitted with wheels to make them easier to move. Eventually, power was supplied in one way or another to the wheeled lines to keep them moving slowly along the desired path parallel to the direction of the main line with flexible hoses extending between the water inlet end of a sprinkler line and the riser to which the sprinkler line was connected. Since the main line can be eight or more inches in diameter with the water pressure in the main line high, the required size and strength of the flexible hoses became extremely burdensome in manual operation. Proposals were therefore made to facilitate connection of the sprinkling lines to successive risers with the least manual effort but to applicant's knowledge no successful machine has been developed prior to his. Three examples of such proposals are illustrated in Engel U.S. Pat. No. 2,740,228, Stafford U.S. Pat. No. Re. 26,285 and Smith et al U.S. Pat. Nos. 3,381,893 and 3,446,434. Such proposals provided for intermittent connection of the sprinkler line to the main line utilizing power assisted mechanical devices as the hoses or telescoping pipes were moved from riser to riser, with the sprinkler line continuing to move along at the desired rate.

In order to provide for a continual source of water to the sprinkler line Rogers U.S. Pat. No. 3,463,175, and Standal U.S. Pat. Nos. 4,036,436 and 4,172,556 proposed systems in which one riser is always connected to the sprinkler line, this being accomplished by having pipe or hose connections to the sprinkler line connect with devices which span three risers. By this arrangement, the forward part of the device is disconnected from one riser and goes on to a second riser ahead of the first riser and on connection of the device with the second riser, the hindmost part of the device, which has been connected to a third riser which is behind the first riser in the main line, moves up to connect with the first riser. As far as known to the applicant, these proposals were never put into use. In addition to requiring closely spaced risers, the mechanical problems associated with the disclosed systems appear to have ruled out their use.

Von Linsowe U.S. Pat. No. 3,729,016 discloses another form of system for continuously feeding the water to a sprinkler line, but this system is extremely complicated and requires trackways and twin main lines since the twin coupling devices for connecting the sprinkler line to the main line cannot pass each other. This proposal appears to have the same history in practice as the Rogers and Standal patents.

Russian Pat. No. 434,918 of 1974 discloses what is intended to be an apparatus for continuous supply of water from a main line to a sprinkler line but the apparatus is obviously inoperative and is inherently unstable.

SUMMARY OF THE INVENTION

In the system and method of the present invention, the faults and disadvantages of the prior systems have been eliminated by the utilization of a plurality of elongated conduits or water carrying arms arranged for successive coupling with novel valves in succeeding risers on a main line by virtue of these arms having their water outlets connected to a rotatable water manifold or water conduit junction means carried along the length of the water main by a conveyance, the water outlet of the rotatable water manifold, being connected to the water inlet end of the sprinkler line through a swivel joint or flexible conduit. The conveyance carries the apparatus along and since a single water carrying arm on the moving conveyance is connected to a single riser at any one time, movement of the conveyance causes or assists the arms and water manifold to rotate and thereby bring the arms successively into coupling relationship with successive risers along the main line. Thus, continuous flow is achieved between the water main line and the sprinkler line without the mechanical and functional difficulties of prior systems.

BRIEF DESCRIPTION OF THE DRAWINGS

FIG. 2 is a plan view of an embodiment which is the same as that illustrated in FIG. 1 but with some components added and some movable components in difference positions;

FIG. 3 is a view in side elevation of the embodiment illustrated in FIG. 2 but with some movable components in different positions;

FIG. 4 is a view in vertical section taken on the line 4—4 of FIG. 3;

FIG. 6 is a view in vertical section taken on the line 6—6 of FIG. 3;

FIG. 7 is a view in vertical section taken on the line 7—7 of FIG. 3;

FIG. 8 is a view similar to FIG. 4 showing an additional component;

FIG. 9 is an enlarged fragmentary view in side elevation of a component of the embodiment illustrated in FIGS. 1, 2 and 3;

FIGS. 12A, 12B, 12C and 12D are views in vertical section of the structure illustrated in FIGS. 10 and 11 with the operating parts shown in different functional positions;

FIG. 14 is a view in side elevation of an embodiment which is the same as the modification of FIG. 13 but with some components added and some movable components in different positions;

FIG. 15 is an enlarged, fragmentary view in vertical section of a component of the modification of FIGS. 13 and 14;

FIG. 16 is an enlarged, fragmentary view in plan of a component of the modification of FIGS. 13 and 14;

FIG. 17 is a plan view of another modification of the present invention;

FIG. 18 is a fragmentary view in vertical section taken on the line 18—18 of FIG. 17, and FIG. 19 is a fragmentary view in vertical section taken on the line 19—19 of FIG. 17.

EMBODIMENT OF FIGS. 1-12

Figure 1:
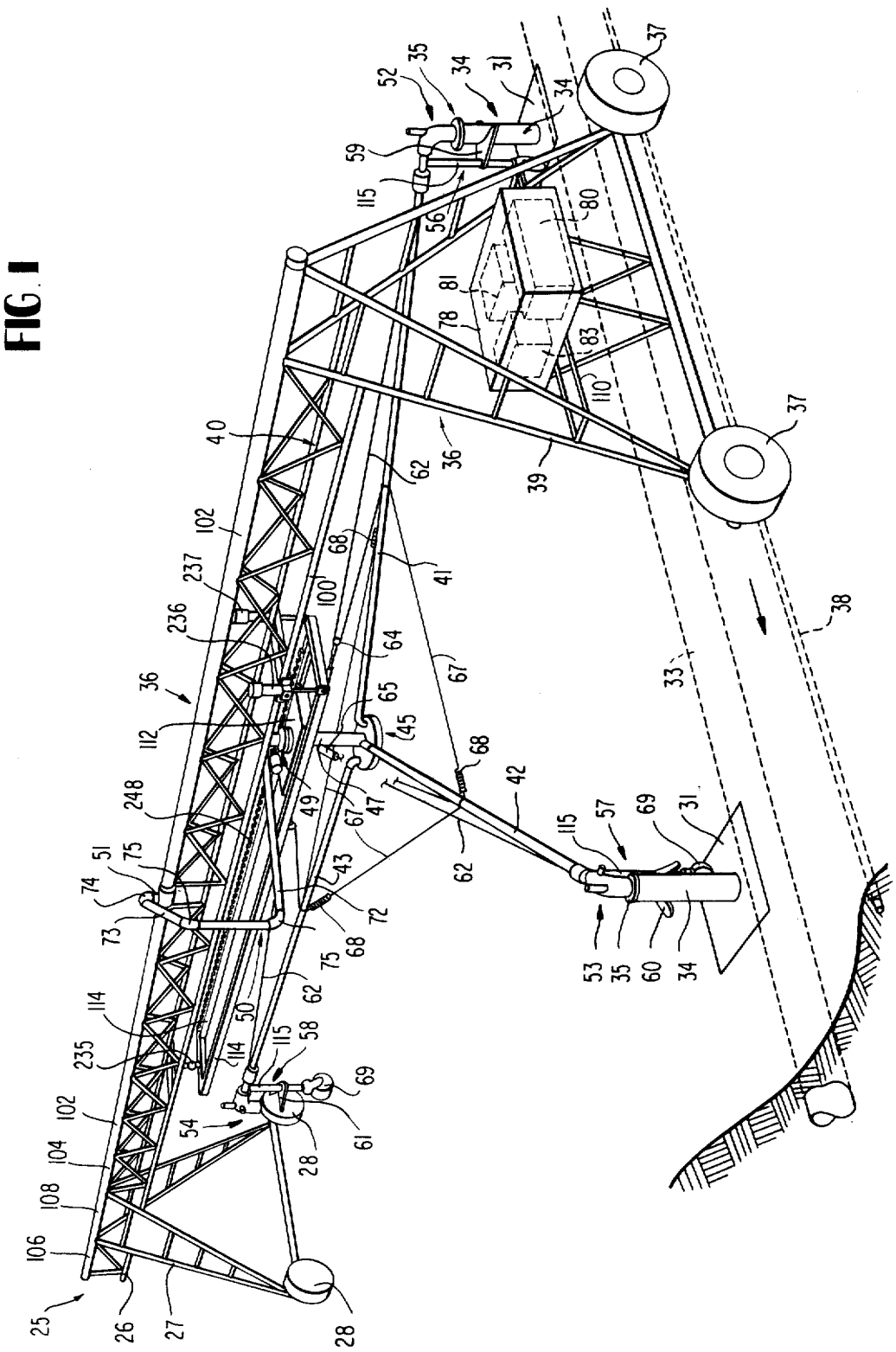
FIG. 1 is a perspective view of the system of the present invention connected to a sprinkler line with the subterranean water main line and conveyance guide line being partially exposed for clarity.

Referring to FIGS. 1 to 5, inclusive, reference numeral 25 indicates generally one end portion of a water sprinkler line supported on a truss 26 and tower 27, the base of the tower being mounted on wheels 28 which can be driven in synchronism by electric motors 29. Reference numeral 33 indicates an underground main line for supplying water to sprinkler line 25 through risers indicated generally at 34. Sprinkler line wheels 28 are so driven as to cause the sprinkler line to move slowly along the field to be irrigated in a direction parallel to the direction of main line 33. Normally closing the upper end of each riser 34 is a novel form of water outlet valve indicated generally at 35. A conveyance in the form of a tractor, indicated generally by reference numeral 36, having tired wheels 37 and driven by electric motors 23 moves in the direction of the arrow along the length of the water main line. The tractor is guided by guide line 38 which is shown as an electrical conduit buried in the ground with an electrostatic pickup device 24 carried by tractor 36, but any suitable type of known guidance system can be used. Tractor 36 in the illustrated embodiment is in the form of an additional tower 39 and another truss indicated generally at 40 connected to the sprinkler line so as to move along the main line at the same overall rate of movement as the sprinkler line, there being well-known means for assuring the synchronism of overall movement between the sprinkler line and the tractor.

Tower 27 can be considered as being part of tractor 36 instead of part of the sprinkler line.

Tractor 36 carries a structure having components for cooperating sequentially with successive valves 35 of risers 34 so as to maintain a constant water supply to the sprinkler line. Where desired a concrete pad 31 having a level top surface is installed in the ground at the base of each riser pipe 34, the distance between the top level surface of the pad and the outlet valve being uniformly the same for all risers 34.

In the preferred embodiment of the present invention, the structure just referred to comprises three water carrying arms or conduits 41, 42 and 43 which are all three connected for water flow at their inner or water outlet ends to water inlets 44, 44, 44 of a water receiving chamber or manifold indicated generally by the reference numeral 45. In turn, a water outlet orifice 46 of water receiving manifold 45 is connected to a structurally rigid water flow pipe or conduit 47 and the upper portion of rigid water flow pipe 47 is in water flow connection through a swivel pipe or conduit, indicated generally at 49, with the water inlet end of a swivelly or pivotally segmented, rigid conduit indicated generally at 50 connected to the inlet 51 leading to water sprinkler line 25. Water receiving chamber or manifold 45 can also be termed a water receiving conduit junction means since it serves the purpose of a junction between water carrying conduits 41, 42 and 43 and rigid water flow pipe 47.

Conduit 50 is shown made up of a segmented, rigid pipe with swivel connections, the pipe sections 71, 72, 73 being connected together and to the sprinkler line 25 through inlet 51 by swivel joints 74, 75 and at the water inlet end thereof to swivel conduit 49 by swivel joint elbow 76. If desired, conduit 50 can be a flexible hose suitably supported.

Water receiving conduit junction means 45, rigid water flow pipe 47, swivel conduit 49 and conduit 50 and their equivalent structures, taken together constitute water flow conduit means connecting the one end portion of each elongated water conduit means for uninterrupted water flow to the inlet of the sprinkler line as the elongated conduit means rotates around the one end portion connected in water flow relation with the sprinkler line.

At their outer ends, elongated water carrying conduits or arms 41, 42 and 43 have coupling devices indicated generally by the reference numerals 52, 53, 54, respectively, which are designed to successively connect or couple with successive riser valves 35 in the direction of tractor and sprinkler line movement. Each water carrying arm 41, 42 and 43 also has at its outer end a wheeled support structure indicated generally at 56, 57, 58, respectively, and a riser pipe locator 59, 60 and 61, respectively. Each water carrying arm is resiliently supported by a cable arrangement comprising a cable 62 passing around a pulley 64, the pulley being connected to a hydraulic cylinder 65. Cables 67, spring tensioned by springs 68, extend between adjacent water carrying arms to position the arms relative to one another in the horizontal plane. Each water carrying arm support structure includes a wheel 69 for successively contacting pads 31 as the associated arm coupling device comes into contiguity with the risers 34.

Certain functional components of tractor 36 are indicated in only phantom form in casing 78 since the operating elements of these components are well known in the art and per se form no part of the present invention. In respect to these, reference numeral 80 designates an internal combustion engine which acts as the prime mover for an electric generator 81 which supplies the overall power for the entire apparatus, including the motors 29 of the sprinkler line and the motors 23 of tower 39. Box 83 represents a collection of electronic components for control of the various automatic functions of the system in a manner well known in the art.

It will be apparent that in the embodiments described in the specification and shown in the drawings, water receiving manifold 45 and associated structure are suspended from above on the tractor 36 which comprises additional truss 40, in this case similar to trusses 26, supported at the outer end by additional tower 39, similar to towers 27. Truss 40 crosses the water main line and is of sufficient height to support the water bearing arms above the risers and of sufficient span between towers so as not to interfere with rotation of the water bearing arms.

In each of FIGS. 1, 2 and 3, consecutively, the tractor 36 is shown as having progressed down the field being irrigated so the water carrying arms are shown in successively advanced positions toward the observer.

In the embodiment shown in FIGS. 1 to 9, the truss portion 40 of the tractor 36 comprises an open work truss which can incorporate as a component a pipe 102, containing inlet 51, connected at one end 104 to the inlet pipe 106 of field sprinkler system 25. This connection can be through the intermediacy of a flexible coupling 108 carried by the tower 27 which in conventional construction would be the first tower of a plurality of aligned mobile towers supporting the sprinkler line across the field to be irrigated. Coupling 108 can be any conventional structure such as those used on the successive towers of a sprinkler line which permit sufficient flexibility along the sprinkler line so as to accommodate changes in the level of the ground and the necessary dressing or alignment of the sprinkler line as it moves down a field. The necessary instrumentation for maintaining alignment of a sprinkler line has been developed and perfected and is no part of the present invention. However, the tractor 36 of the present invention does act as a moving "anchor" at the main line from which point in one or both directions alignment of the sprinkler line is maintained. The other end of truss 40 is supported by tower-like structure 39 which is similar to truss 27 but includes provision of a platform 110 for mounting casing 78, motor-generator set 80, 81 and electronic instrumentation cabinet 82. It will be understood that tractor 36 need not necessarily be similar in construction to the combined trusses 26 and associated towers 27 of a sprinkler line; any form of tractor apparatus capable of carrying necessary power equipment and having structure of sufficient height to support the rotating water manifold 45 and associated water carrying arms 41, 42, 43 in connectable relation to risers 34 being all that is necessary.

It will be understood from the description thus far that water receiving manifold 45 is connected on the water inlet side to water carrying arms 41, 42, 43 and on the water outlet side to rigid pipe 47 and thence to pivotal or swivel conduit 49, the latter being mounted on a rolling carriage 112, all constituting an integrated structure for bringing coupling members 52, 53 and 54 into consecutive water flow connection with risers 34 through the medium of the special valves 35 in risers 34 and cooperating valve openers associated with the coupling members.

Water receiving manifold 45 is rotatably suspended from rolling carriage 112, this carriage being mounted on four identical rollers 113 which ride transversely of the path of movement of the tractor in a trackway 114 carried by lower chord 100 of truss 40.

Figure 5:
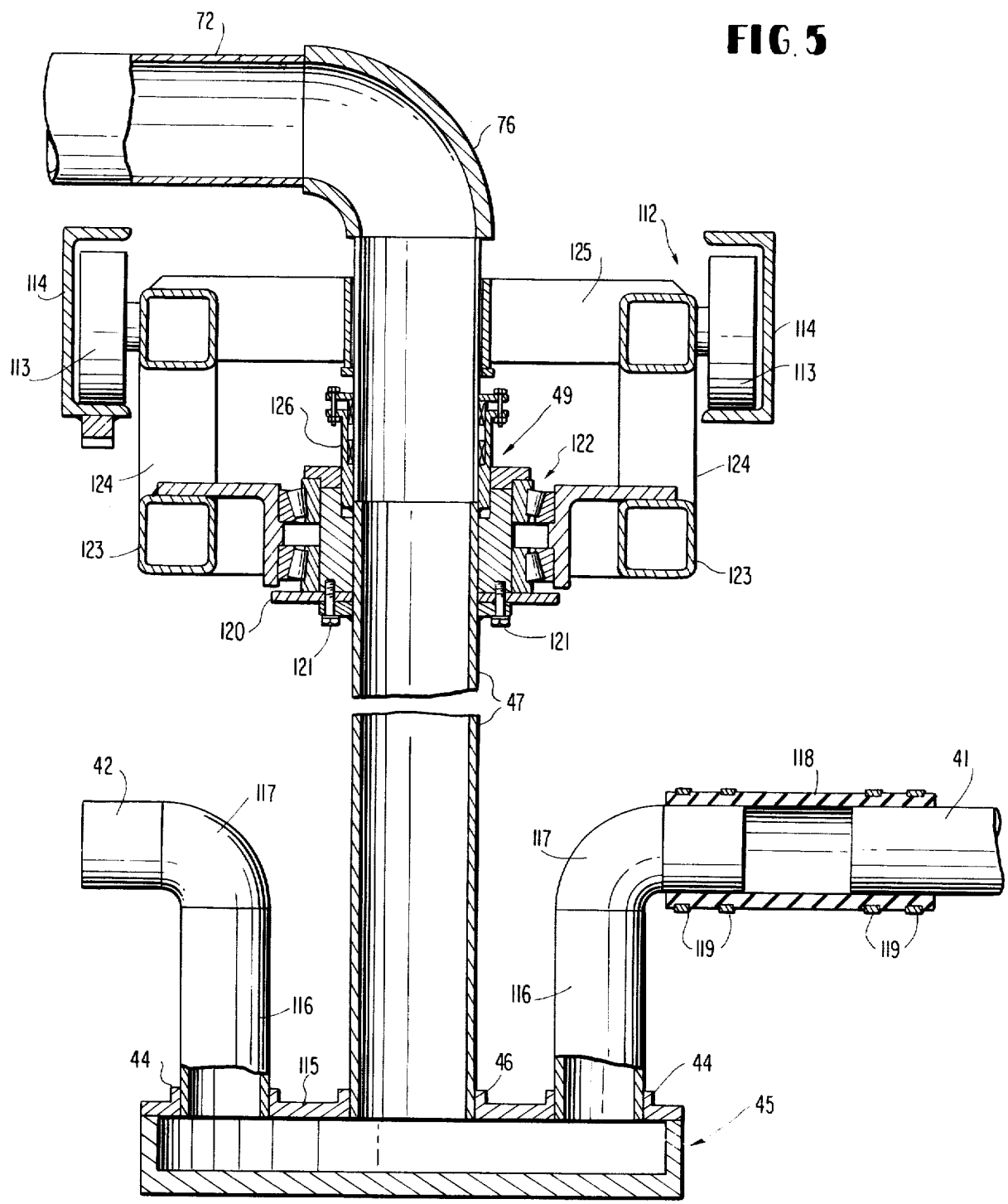
FIG. 5 is an enlarged view in vertical section of a component of the embodiment illustrated in FIGS. 1, 2, 3 and 4.

The construction of the water receiving manifold 45, the connection of water receiving manifold 45 to each of the water carrying arms 41, 42, 43, the connection of water receiving manifold 45 with rigid pipe 47 and connection of rigid pipe 47 with swivel conduit 49 are illustrated in FIG. 5. Only one water carrying arm connection is illustrated, the others being identical. At the water receiving manifold, water flow structural pipe 47 is rigidly mounted in outlet 46 of the casing 115 of the manifold. Each water carrying arm has an outlet end portion connected to the manifold through a short pipe section 116, an elbow 117 and a flexible connection made up of a short section of heavy rubber hose 118. The rubber hose section connects the water carrying arm to the manifold with some degree of flexibility. Each end of the section of flexible hose 118 telescopically receives the end section of elbow 117 and the end section or portion of the water carrying arm involved, arm 41 being specifically illustrated in FIG. 8. High tensile steel bands 119 are tightened in known manner around the portions of the hose section telescopically receiving elbow 117 and the end portion of arm 41. As already described, cables 62 and hydraulic cylinders 65 support the water carrying arms vertically and spring tensioned cables 67 hold the water carrying arms in horizontally spaced relationship to each other but in each case with hose section 118 permitting slight flexing of the arm in any direction.

The entire manifold and water carrying arms structure is carried on structural pipe 47 which in turn is suspended from rolling carriage 112 through the medium of a swivel conduit 49. The swivel conduit 49 is illustrated in FIG. 5 as comprising a flange 120 rigidly mounted as by welding on structural pipe 47, flange 120 being suspended by lug bolts 121 from the rotatable components of a roller bearing structure 122. The stationary components of the roller bearing structure are supported by a framework 123 suspended by structural members 124 from rolling carriage 112. The water receiving elbow 76 of pivotally segmented conduit 50 is received by a pivot keeper 125 rigidly carried by the rolling carriage 112. The upper end of structural pipe 47 is rigidly connected to one component of a packing gland 126, the packing gland sealing the swivel joint between conduits 47 and 76 against water leakage. By this construction, the water receiving manifold and all associated structure are supported for 360° rotation, or less where desired.

In the disclosed embodiment a rigid strut 115 connects each wheel 69 with its associated water carrying arm so that when wheel 69 is in contact with a pad 31, rigid strut 115 and wheel 69 can, as described below, exactly position the associated coupling member 52, 53 or 54 at the right height for connection with the valve 35 of the succeeding riser. Each of the water carrying arms 41, 42 and 43, when its coupling member 52, 53 or 54, respectively, is not contiguous to or connected to a riser, is preferably maintained at a height above the ground greater than the heights of the risers by means of hydraulic cylinders 65 and cables 62, thereby suspending the associated wheels 69 out of contact with the ground. As a coupling member approaches a riser the associated hydraulic cylinder 65 is activated to start lowering the associated water carrying arm so as to bring wheel 69 into contact with the concrete pad 31 at the riser. This will initiate the operation of a mechanism to deactivate the associated hydraulic cylinder 65 to position the associated coupling member at the right height for coupling with the riser valve. This action can be accomplished utilizing the mechanism illustrated in FIG. 9. In this mechanism, the wheel mounting fork 116 for wheel 69 is pivotally connected at 117 to the lower end of strut 115. A compression spring 118 maintains fork 116 in the position shown in this figure when wheel 69 is carrying a predetermined fraction of the weight of the water carrying arm. When wheel 69 is carrying less than this fractional weight or is suspended above the ground, fork 116 moves downwardly and microswitch 119 is actuated. During movement of the water carrying arm between risers this switch circuit is blocked but as the coupling member approaches the pad of a riser and the associated cylinder 65 starts lowering the arm, this switch circuit is unblocked and actuation of microswitch 119 gives an electrical signal which assures continuation of this arm lowering operation. When wheel 69 contacts the ground or preferably concrete pad 31, fork 116 moves upwardly or in a clockwise direction around pivot 117 to thereby deactivate microswitch 119 and actuate microswitch 120. Actuation of microswitch 120 will reverse the action of hydraulic cylinder 65 to take weight off wheel 69 until compression spring 118 positions fork 116 in a position where neither microswitch is actuated, thereby deactivating cylinder 65 and stopping movement of the coupling member in a position at the proper height for coupling with the riser valve. Thus it will be seen that even some slight canting or departure from the horizontal of water manifold 45 due to differences in ground level over which tractor 36 is traveling is fully accommodated by the mechanism just described. It is important that each moving water carrying arm not connected or approaching a riser be maintained at a sufficient elevation above the ground by the associated hydraulic cylinders 65 and associated cables 62 so that a wheel 69 does not strike the ground with sufficient force to damage the microswitches 118, 120.

Figure 10:
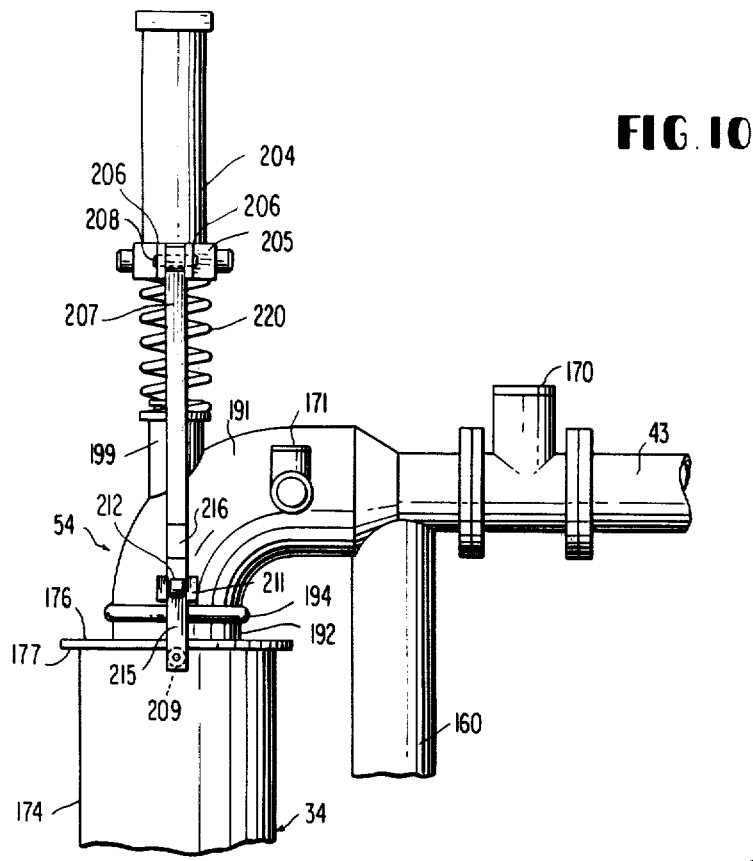
FIG. 10 is an enlarged view in side elevation of one of the three identical structures at the outer ends of the three arms illustrated in FIGS. 1, 2 and 3.
Figure 11:
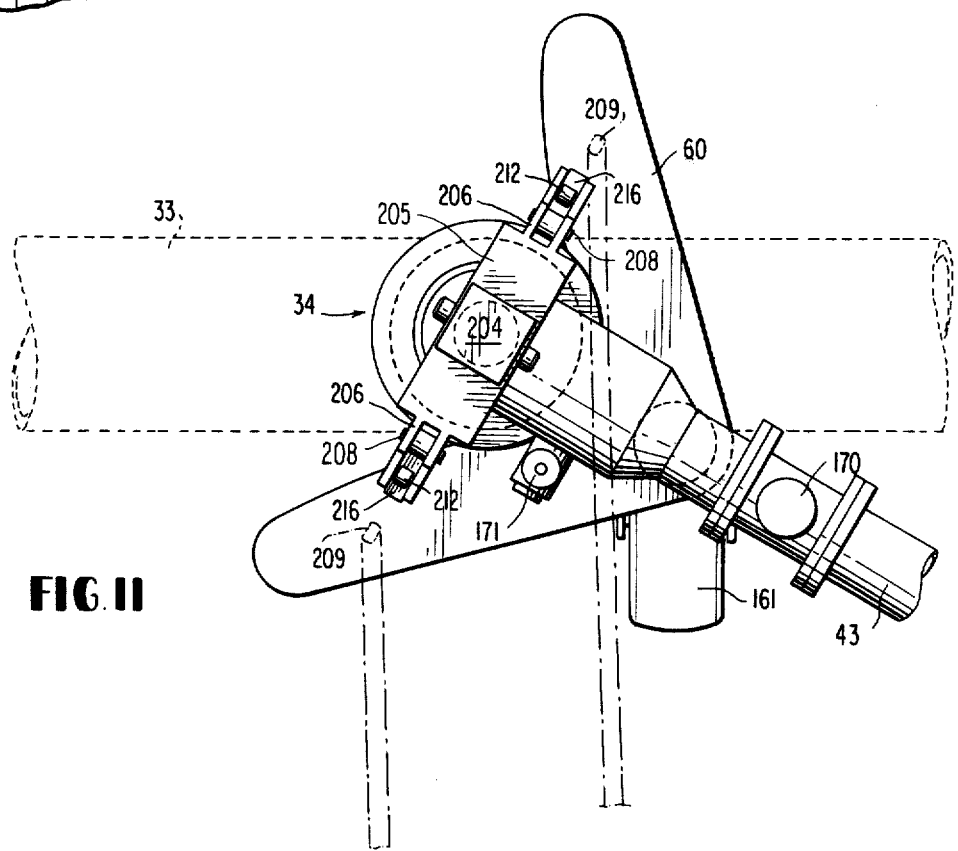
FIG. 11 is a plan view of the structure illustrated in FIG. 10 and showing the water main line in phantom.

Referring now to FIGS. 10 to 12, the details of the structure at the end of each water carrying arm including the coupling members 52, 53, 54 and the special outlet valves 35 on risers 34 will be described in detail. In FIGS. 10 and 11 reference numeral 170 indicates an electric solenoid operated water flow control valve for opening and closing water bearing arm 43, this valve being closed at all times that the water bearing arm is not in water flow relation to an associated outlet valve 35. Reference numeral 171 indicates a solenoid operated bleeder valve the function of which will be explained below.

Considering the FIG. 2 showing which is based on the assumption that coupling member 53 has made connection with an outlet valve 35 and coupling member 54 is moving toward coupling connection with an outlet valve 35, FIGS. 10, 11 and 12 will be described in reference to coupling member 54 as it enters into contiguity with the associated outlet valve 35. Again, however, all three water carrying arms and associated coupling apparatuses are the same and the description of one will suffice for all of them in respect to their sequential connection and disconnection from the outlet valves 35.

FIGS. 10, 11 and 12 show that the actual riser pipe 34 in each case incorporates a pipe 173 which is protected against impact by a casing 174 filled with concrete 175. The concrete pad 31 also aids in protecting the riser structure. At its upper end riser pipe 173 carries the water outlet valve 35, which valve structure is centered in casing 174 by a reinforcing plate 176 attached to the upper end of casing 174 with a horizontal flange 177 extending around its entire periphery and projecting outwardly of the casing.

Water outlet valve 35 further comprises an enlarged housing 180 enveloping the valve structure proper, the latter consisting of a supporting spider 181 which slideably receives a valve stem 182 carrying the valve closure disc 183, spring pressed by coil spring 184 into seating engagement with valve seat 185. A cylindrical portion 186 of the valve housing 180 extends upwardly into sealing engagement with plate 176. A groove and an internally positioned O-ring indicated at 187 are located at an intermediate point in the height of the cylindrical portion 186.

The coupling member 54 has enlarged housing 191 which includes a cylindrical downwardly extending portion 192 housing a reciprocating, telescopingly received, cylindrical water conducting member 193, cylindrical portion 192 having a groove and an internally positioned O-ring 194 at an intermediate point in the height of cylindrical portion 192, the O-ring sealing the space between cylindrical portion 192 and cylindrical water conducting member 193 while permitting reciprocating movement of water conducting member 193. A spider 195 carried by the uppermost portion of the water conducting member 193 slideably receives a rod-like valve actuating member 197 while permitting water to pass through housing 191 to valve 170 and water carrying arm 43. Housing 191 has projecting through its wall a packing gland 199 which permits valve actuating member 197 to extend out of the casing while permitting water sealed reciprocating movement thereof through the housing wall. A collar 201 fixedly secured to valve operating member 197 supports cylindrical water conducting member 193 with cylindrical water conducting member 193 being slideable on valve actuating rod 197. A second collar 202 is fixedly secured on valve actuating rod 197 above spider 195 of water conducting member 193. The uppermost portion of valve actuating rod 197 is intergral with the lower end of a piston rod 196 which enters into and is joined to a piston in a hydraulic cylinder 204. A bracket 205 is fixedly secured to the lower end of cylinder 204, bracket 205 having ears 206, 206 at its outer ends for pivotally supporting a pair of depending arms 207, 207 on pins 208, 208. At their lowermost ends depending arms 207 carry inwardly projecting rollers 209, 209 designed to engage under flange 177 and rotate in respect thereto with the underside of flange 177 acting as a circular track or bearing surface. On the depending cylindrical portion 192 of housing 191 a bracket is fixedly secured having outwardly extending bifurcated arms 211, 211 forming slots through which depending arms 207 slideably pass. At the outer end portions of such slots are pins 212, 212 and on the innermost portion of such slots are two additional pins 213, 213. Pins 212 and 213 cooperate with camming surfaces on opposite sides of a pair of identical camming members 215, 215, one set of camming surfaces being indicated at 216, 216 and the other set of camming surfaces being indicated at 217, 217.

Surrounding valve piston rod 196 where it enters cylinder 204 and disposed between the lowermost end of cylinder 204 and the upper surface of packing gland 199 is a strong coil spring 220 which can be held in its compressed state when the piston rod end 196 of valve actuating rod 197 is in fully retracted position in cylinder 204.

FIGS. 10 and 11 show the coupling member, indicated generally at 54, in coupled position with the casing 174 of a riser 34. FIGS. 12A, 12B, 12C and 12D demonstrate how the components of coupling member 54 make the connection with riser casing 174, seal off the joint between the coupling member and the outlet valve 35, and open valve 35.

As will be seen in FIG. 12A, as the coupling member approaches riser 34 and is guided into vertical alignment with outlet valve 35 by locator member 61, rollers 209 are held in such spaced relation from each other that they will clear flange 177. Additionally, the distance between rollers 209 and the lowermost edge of cylindrical coupling element 192 is appreciable and allows tolerance, if needed, relative to the height of coupling member 54 above the outlet valve while still properly positioning the parts for connection. It will also be clear that coupling member 54 can approach riser 34 at a considerable height so long as locator member 61 can make contact with casing 174 of the riser.

Starting with the operating parts of coupling member 54 and outlet valve 35 as shown in FIG. 12A, the hydraulic fluid on the lower side of the piston in cylinder 204 has its pressure reduced permitting coil spring 220 to push cylinder 204 and framework 205, 207 upward relative to arms 211. Upon such movement, cam surfaces 216, 216 move rollers 209 inwardly and as cylinder 204 and the depending framework continue to move upwardly, rollers 209 engage flange 177. Coil spring 220 is strong enough, acting through the depending framework and rollers 209 under flange 177 to hold the coupling member and outlet valve 35 in registry ready for water-tight coupling and subsequent valve opening actions, as shown in FIG. 12B.

Considering next the transition from FIG. 12B to FIG. 12C, with the coupling member in the position shown in FIG. 12B, the hydraulic fluid in cylinder 204 is increased in pressure on the upper side of the piston to extend piston rod 196 downwardly to cause collar 202 to engage spider 195 and thereby move cylindrical water conduit member 193 downwardly into the cylindrical portion 186 of outlet valve housing 180, the shamfered lower edge of cylindrical water conduit 193 assuring registry and a telescoping relationship of that part within the cylindrical portion 186 of outlet valve housing 180.

As shown in FIG. 12D, continued movement of piston rod 196 and valve actuating rod 197 carries cylindrical water conduit member 193 farther down and into sealing engagement with O-ring 187 thereby completing the sealed water flow passage between the outlet valve housing 180 and the water carrying arm, and water can flow through this passage as the completion of the movement of valve operating rod 197 pushes valve plate 183 open against the pressure of spring 184.

Since a short interval of time elapses from the time locator member 61 brings coupling member 54 into contiguity with an outlet valve 35 until the coupling member is in position to open the outlet valve 183, a time-delay mechanism, not shown, is included to delay valve opening operation of the valve operating rod 197.

A water pressure sensitive control (not shown) in housing 191 in association with electronic controls back at the conveyance closes bleeder valve 171 and opens solenoid water flow control valve 170.

It will be noted that rollers 209 and associated structure permit water carrying arm 43 to rotate around the riser 34 while maintaining water-tight connection of coupling member 54 with outlet valve 35.

Turning now to coupling member 53 which is connected in water flow relation to a water outlet valve 35 (FIG. 2), at the time locator member 61 of arm 43 lines up coupling member 54 with the outlet valve 35 as just described, the delay signal already mentioned delays the disconnect sequence of actions in coupling member 53 until valve 183 as just described has opened to place water carrying arm 43 in water flow relation with the main line. This delay is advisable so that at least one water carrying arm is in water flow connection with the main line 33. The conveyance 36 can pause while these operations take place and then continue its onward movement.

It is to be understood that there can be an appreciable time lag in making the connection and valve opening at an outlet valve (for example a minute) because the entire sprinkling line can pause and the lack of any forward movement of the line for long enough to make and break the connections at the risers will have no objectionable effect. Thus these connection and disconnection actions are not necessarily simultaneous but only approximately so.

Before breaking the coupling member 53 connection, a control at 83 in conjunction with the initiation of disconnection of the outlet valve 35 and coupling member 53 acts to close the solenoid corresponding to that shown at 170 and open the bleeder valve corresponding to that shown at 171, in FIGS. 10 and 11. The bleeding action is advisable to gradually relieve the water pressure differential across the valve elements.

All the coupling members and outlet valve members being identical, the showings in FIGS. 12D, 12C, 12B and 12A in that order illustrate the sequence of actions in breaking the connection between coupling member 53 and the associated outlet valve 35. Considering FIG. 12A it will be noted that increasing the pressure on the lower side of the piston in hydraulic cylinder 204 will compress spring 220, at the same time pulling up arms 207 and causing cam surfaces 217, 217 to spread arms 207 and disengage rollers 209 from the undersurface of flange 177, permitting coupling 53 to move away from the outlet valve 35.

As tractor 36 moves down the field, wheels 28 and 37 will at times encounter different ground levels which will cause truss 40 to depart from a horizontal position longitudinally. Additionally, although to a smaller degree, forward wheels 28 and 37 may encounter different ground levels than trailing wheels 28 and 37 causing truss 40 to depart from the horizontal plane transversely. Since any of these movements would affect the stability of carriage 112 and in turn water manifold 45 and water carrying arms 41, 42 and 43, provision is made for maintaining track 114 as close as practicable to the horizontal. This is accomplished by supporting one end of the track through the medium of a universal joint 235 and the other end by a pair of hydraulic cylinders 236 and 237 mounted on truss 40 by brackets 238. Pipe elbows 75, 75 are designed to be flexible enough to accommodate any slight departures of water flow pipe 47 from the vertical due to slight canting movement of trackway 114 not entirely compensated for by cylinders 236 and 237. By means of conventional instrumentation, not illustrated, cylinders 236 and 237 maintain track 114 in or as near as practicable to a horizontal plane thereby maintaining water manifold 45 and water carrying arms 41, 42 and 43 as near as practicable in horizontal planes.

In describing the embodiment of FIGS. 1 to 12 it was stated that movement of tractor 36 along the length of the main line caused rotary movement of water carrying arms 41, 42 and 43 by virtue of reaction between the risers 34 and the arm coupled to a riser. However, in view of the appreciable weights involved in respect to the water carrying arms and in view of the stresses applied to the water manifold 45 by the reaction between the coupled water carrying arm and riser, it may be desirable in this embodiment to utilize power means for counteracting any desired part of the water carrying arm reaction on the riser. Since the reaction between the water carrying arm and the riser and the amount of movement of carriage 112 along trackway 114 vary in magnitude depending upon the position of the water carrying arm coupled to the riser, it is desirable to have a slip-clutch type drive arrangement. Thus, considering FIG. 1, with water carrying arm 42 coupled with the associated riser valve 35 and water carrying arm 41 being uncoupled from the associated riser valve 35, a large component of force is exerted on water carrying arm 42 along its length by reaction at the associated riser valve 35 because of the acute angle of the water carrying arm to the direction of movement of tractor 36. Utilizing fluid drive, for example, a desired amount of torque on rigid water flow pipe 47 or push on carriage 112 can be supplied to cause the desired movement of water carrying arm 42 without objectionably stressing the structures involved. A slip-clutch or fluid drive will also permit momentary cessation of rotation of the water carrying arms at those times when two coupling members may be connected to two risers at the same time.

Power actuated means are therefore provided for the disclosed embodiments and such power assist means can be associated with the rotation of the water carrying arms or with the reciprocating movement of the water manifold toward or away from the direction of the water main or with both.

Referring especially to FIG. 8, the means for taking stress off the riser due to resistance of the water bearing arms to rotation is shown as comprising a gear 240 fixedly mounted on rigid water flow pipe 47 which carries water manifold 45 and the water carrying arms. The teeth of gear 240 engage a pinion gear 241 mounted on a shaft 242 of a conventional combination electric motor and fluid drive device 244. The combination electric motor and fluid drive device is designed to supply sufficient torque to the rotating water manifold 45 and the involved water bearing arm so that no objectionable stress is placed on the coupled riser, the coupled water bearing arm or the water manifold supporting structure due to rotative forces.

Relative to reciprocating motion of carriage 112, it will be observed from FIG. 1 that as the tractor 36 moves in the direction of the arrow along the main line the force applied to water bearing arm 42 by riser 34 has a large vector component tending to bend rigid water flow pipe 47 and possibly rigid water carrying arm 42 and to urge carriage 230 against its side thrust bearings 246. To obviate this stress on the structures involved, a rack 248 is provided on one track 114 extending lengthwise of the trackway. A pinion gear 249 carried by a shaft 250 is operatively meshed with rack 248, the shaft being turned by a conventional combination electric motor and fluid drive device 251. Combination electric motor-fluid drive device 251 places a driving torque on pinion gear 249 and rack 248 sufficient to remove objectionable stresses from water carrying arm 42, water manifold 45, rigid water flow pipe 47 and carriage 112 by moving the carriage along trackway 114 with a force that balances a desired portion of the force which would otherwise be applied by riser 34 along the length of water carrying arm 42. When carriage 112 reaches the end of track 233, an electric switch (not shown) can be utilized to reverse the direction of rotation of the combination electric motor-fluid drive device, and the force applied to carriage 112 by pinion gear 249 and rack 248 will then move carriage 112 in the direction of the main line in a manner to remove objectionable stresses applied through water carrying arm 42 to water manifold 45 and thence to rigid flow pipe 47 and carriage 112 by tension applied to water carrying arm 42 at riser 34. The moving force applied to carriage 112 can be designed to supply a desired variable force so as to just balance the force exerted on the carriage by the water carrying arm. This also applies to gear 240 to which can be applied enough torque to balance resistance of the water bearing arms to rotation. In any event, it will be obvious that momentary cessation of movement of the water bearing arms will not adversely affect the system just described because of the fluid drive characteristics of devices 240, 241 and 242.

Where desired more sophisticated controls can be utilized in relation to combination electric motor and fluid drive devices 244 and 251 by incorporating stress indicating devices at the coupling member of each water bearing arm, operative when the coupling member is coupled to a riser valve 35 which will control the speed of the electric motor or the torque delivery characteristics of the fluid drive component or components being used to vary the torque outputs so as to exactly balance the stress which would otherwise be applied along the length of the coupled water bearing arm involved.

It will be noted that by utilizing the associated cable 65 to raise or lower the water carrying arm farthest from the water main as a coupling member approaches a riser valve, the height and angularity of the approaching arm and coupling member can be controlled by tension on cables 67 to facilitate registry of that coupling member and the associated valve and thereby expedite the coupling action.

It has been stated earlier in this specification that the coupling between one water bearing arm and the associated riser is maintained until the coupling between a second water bearing arm and associated riser has been completed. In this respect, it is often advisable to stop the tractor long enough so that two water carrying arms are connected to adjacent risers momentarily thereby assuring maintenance of water pressure in the sprinkler line.

It is conventional for the plurality of sprinkler line components to be aligned by individual components starting and stopping independently. In this way the sprinkler line and the tractor move together at the same overall rate of movement and not usually in synchronism.

MODIFICATION OF FIGS. 13-16

FIGS. 13-16, taken with the preceding figures, illustrate a modification of the present invention which is similar in all respects to the embodiment just described except that instead of three water carrying arms at 120° angular spacing, two water carrying arms at 180° angular spacing are utilized. This modification is made possible by any power assist means for rotating the water carrying arms and/or any power assist means for acting on the movable carriage but preferably as illustrated in FIGS. 1, 2, 3 and 8 of the previously described embodiment. In FIGS. 13-16 the same reference numerals are used to indicate the same or equivalent components as those used in reference to the embodiment already described but with the reference numerals in FIGS. 13-16 being primed so as to, insofar as practicable, eliminate repetition of descriptive material in the specification.

In this modification, the water carrying arms are designated by reference numerals 41' and 42' since there are only two of them. The two water carrying arms of this modification connect to a water receiving conduit junction means or manifold 45' which has two water admission points 180° apart instead of the three at 120° apart as in the preceding embodiment. In order to simplify the plan view showing in FIG. 13, the short flexible hose connections like those designated by reference numeral 118 in the previous embodiment do not appear and the supporting cable and hydraulic cylinders designated by the reference numerals 62 and 65 respectively in the preceding embodiment have been omitted, although both of these components and their functions are present as will be evident from inspection of the elevational view of FIG. 14. Since arms 41' and 42' in the modification of FIGS. 13–16 are at 180° angular displacement in respect to each other, instead of cables 67 of the previously described embodiment, the Y-shape of conduit junction means 45' and hose connections 118' resiliently constrain water carrying arms 41' and 42' to their 180° relationship.

In the modification of FIGS. 13–16, the power assist means illustrated in FIG. 8 for rotating the water carrying arms 41', 42', indicated in FIG. 8 by reference numerals 240, 241 and 242 and the power assist means shown in FIG. 8 for moving the mobile carriage 112', indicated in FIG. 8 by reference numerals 248, 249, 250 and 251, either one or both, constitute an important part of the combination. As in the previous embodiment, a fluid drive type of power assist is preferable.

The modification illustrated in FIGS. 13–16 differs additionally from the illustrated structure of the previously described embodiment by omitting wheels 69, thereby relying entirely on hydraulic cylinders 65', 65' and cables 62', 62' for supporting the water carrying arms while the arms are not connected in water-flow relation to valves 35', the operation of cylinders 65', 65' being as already described in respect to the preceding embodiment. Obviously wheels 69 can be omitted in the previously described embodiment.

Figure 13:
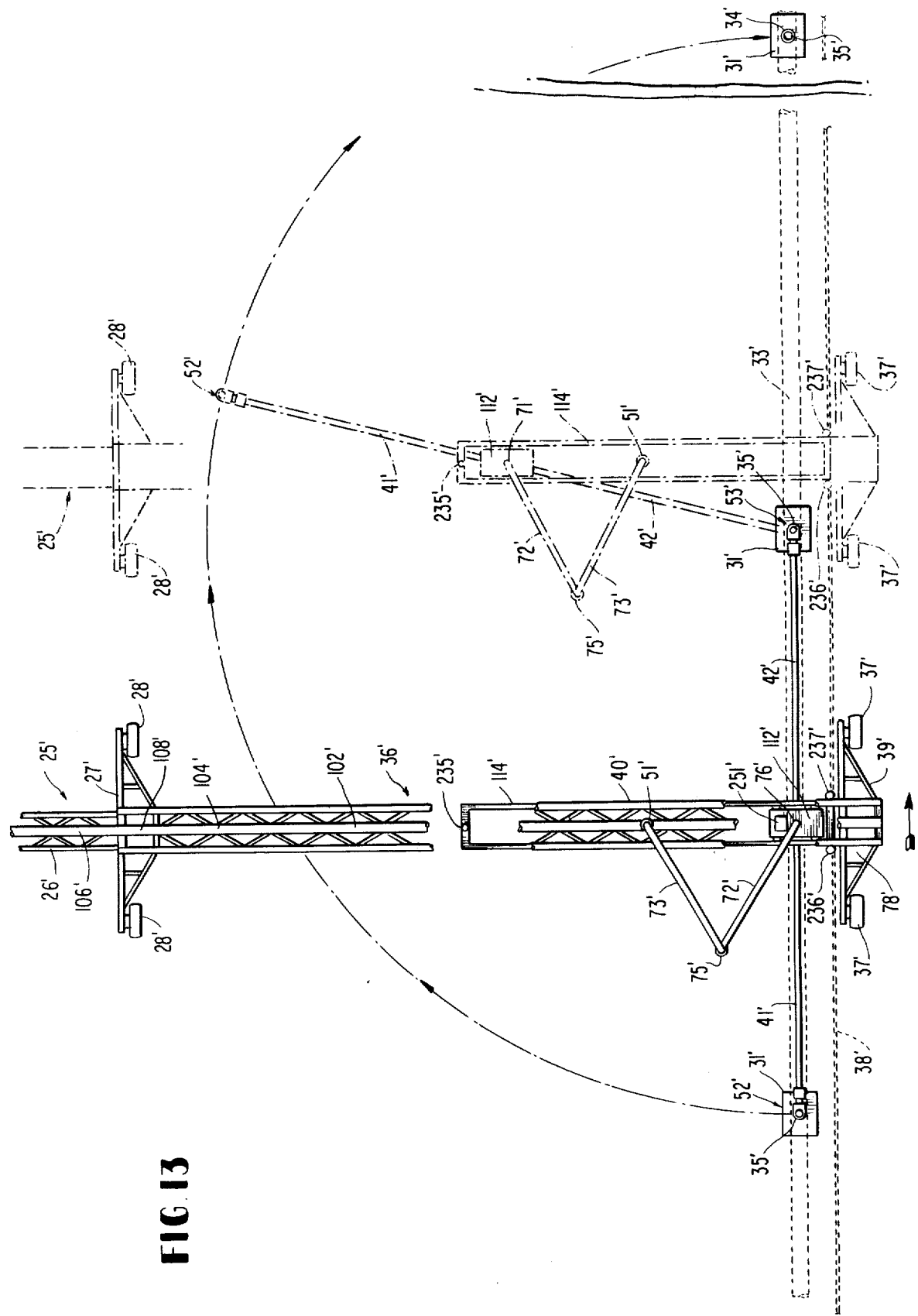
FIG. 13 is a view in plan, similar to FIG. 2 of a modification of the present invention.

Occasionally the distance between risers 34' will differ slightly in the field thereby making connection of, for example, water carrying arm 41' to the next riser 34' as shown in dash-dot lines in FIG. 13, more difficult because water carrying arm 42' is still connected to its associated water outlet valve 35. To solve this problem extensible means indicated generally by reference numeral 300 are diagrammatically illustrated by rectangles in FIG. 13 and illustrated more specifically in FIGS. 14 and 16. Since these means on each water carrying arm 41' and 42' can be identical, the one carried by water carrying arm 41', illustrated in FIG. 16, will be described. A water carrying tube 302 is telescopically and sealingly received within and in water flow connection with a water carrying cylinder 304 carried by and in water flow connection with the end of water carrying arm 41'. At the outer end of tube 302 and in water flow relation therewith is rigidly mounted a coupling or connecting means 52', which can be identical with that illustrated in FIGS. 10 to 12. As shown best in FIG. 14, riser locators 59' and 60' are carried by struts 115', 115' as previously described. On opposite sides of water carrying cylinder 304 are a pair of balanced hydraulic cylinders 306 which by fluid pressure on either end of their pistons, not shown, move piston rods 307, 307 synchronously to extend or retract coupling or connecting member 52'. When the piston rods 307 are fully retracted, the combined length of water carrying arms 41' and 42' plus hoses 118' and conduit junction means 45' is less than the shortest possible distance between adjacent risers 34'. When piston rods 307, 307 are fully extended, the distance between coupling means 52' and 53' is slightly greater than the greatest possible distance between adjacent risers. It will be evident that if the tractor 36' can be moved slightly at the time of making a riser connection, one extensible means 300 at the already connected coupling member 52' or 53' can take care of extending the other coupling means to the next riser. Normally, however, the use of two extensible means 300 is more desirable.

During movement of conveyance 36 both extensible means 300 will normally be carried in the fully retracted position. When an unconnected water carrying arm has moved into alignment with the riser to which it is to be connected, the associated extensible means is activated by the electronic means in box 83 to begin extending. When the associated locator 59' or 60' has registered the coupling member with the water outlet valve, the electronic controls stop movement of the extensible member. When a water carrying arm has been disconnected from a riser and is ready to move, the associated extensible means retracts and the associated locator will clear that riser.

If a riser is slightly out of line with other risers on the main line, locator 59' or 60' in being brought into contact with the nonaligned riser by the associated extensible means 300 will guide the associated coupling member 52' or 53' into registration with the associated water outlet valve 35', flexible hose section 118' acting to accommodate the slight degree of flexing adjacent the conduit junction means 45' which will in such case take place.

Where desirable, extensible members similar to those shown at 300 can be used in the other embodiments described in this specification. In respect to the solenoid valve 170 described in the previous embodiment and indicated at 170' in the present embodiment, in both the previous embodiment and the present embodiment a water pressure operated check or slam valve can be substituted to eliminate the need for automatic control of this valve, the check valve being acted on by water pressure in the arm to close the associated water carrying arm against loss of water pressure in the sprinkler system when valve 183 is closed and bleeder valve 171 has opened and the arm is ready to be disconnected from a riser.

Assuming in FIG. 13 that coupling member 53' has just come into registry or connecting position with the associated water outlet valve 35', the same sequence of functions will take place as described in the preceding embodiment in connection with FIGS. 10–12 for bringing water carrying arm 43 and coupling member 54 into water flow relationship with main line 33. Coupling member 52' of the present embodiment will then go through the sequence of operations already described in the previous embodiment by which it is disconnected from the associated water outlet valve 35. During these two operations tractor or conveyance 36' will be momentarily stationary. Substantially simultaneously with tractor 36' starting to move in the direction of the arrow in FIG. 13, one or both power assist means 240, 241, 244 and 248, 249, 251 as disclosed in FIG. 8, will be actuated to start arms 41' and 42' rotating and start carriage 112' moving outwardly away from the main line. It follows that coupling member 52' will start to move as indicated by the dash-dot line in FIG. 13 at right angles to the main line 33' and away from the associated water outlet valve 35' and the "head on" alignment of arms 41' and 42' at coupling member 53' with the associated water outlet valve 35' will be converted into a pivotal movement at coupling member 53'. As tractor 36' progresses down the main line to the right in FIG. 13, water carrying arms 41' and 42' will assume the position shown in dash-dot lines in FIG. 13 with coupling member 52' approaching the next riser 34' and next outlet valve 35'. At the point where mobile carriage 112' reaches the far end of track 114 relative to the main line, the carriage can actuate a switch which will reverse the direction of the mobile carriage power assist, when that power assist is being used, alone or in conjunction with the rotating power assist means for the water carrying arms. At the time coupling member 52' reaches the next valve 35', tractor 36' will again pause in its movement along the main line and the power assist means mechanism or mechanisms being used can be made inoperative by electronic means at 83 and the same sequence of functions carried out as just described in respect to the tractor being in full line position. On completion of the coupling connection between coupling member 52' and the extreme right hand valve 35' in FIG. 13 and the disconnection of coupling means 53', the power assist means can again be made operative to start the water carrying arms rotating or the mobile carriage 112' moving or both, substantially simultaneously with the tractor 36' starting into motion. In each case locator 60' and locator 59' will operate respectively as described above to extend the extensible means 300 to register the respective coupling members 53' and 52' with the respective water outlet valves 35' and to retract when the tractor is moving. Thus the modification of FIG. 13 will function in a manner equivalent to that of the embodiment previously described.

MODIFICATION OF FIGS. 17-19

In FIGS. 17-19 the same reference numerals are used to indicate the same or equivalent components as those used in reference to the embodiments already described, but with the reference numerals in FIGS. 17-19 being double primed, so as to insofar as practicable eliminate repetition of descriptive material in the specification.

In the modification of FIGS. 17, 18 and 19, water receiving conduit junction means or manifold 45" is supported from below on a rolling carriage 112" mounted on four identical rollers 113" which ride in a trackway 114" carried on a base structure indicated generally by reference numeral 400, base structure 400 being rigidly mounted on tractor 36" transversely of the path of movement of the tractor. Carriage 112" has a depending flange 402 on each side which projects downwardly below tracks 114". Base structure 400 supports a movable endless belt 404 and a connecting bar 406 which connects the depending flanges 402 to movable belt 404. A pair of rollers 408 receive around their peripheries movable belt 404 so as to permit the belt to move freely in a controlled path. The lower reach of the belt has connected to it by a bar 410 a counterweight 412, the mass of which substantially balances the weight of water receiving manifold 45" and its associated water carrying arms 41", 42", 43" and rigid water flow pipe or conduit 47".

Rigid water flow pipe 47" can be connected to a segmented pipe with swivel connections such as pipe 72, 73 in the earlier described embodiments but in view of the straight line movement of water receiving manifold 45" in this modification, a telescoping water carrying conduit 414 pivotally connected for water flow at both ends can be utilized to carry the water to the sprinkler line, not shown.

To achieve a resilient connection between the water carrying arms 41", 42" and 43", as seen in FIG. 17, water carrying arm 41" can act as a reference point and a pair of opposed springs in cylinder 416 act on associated piston rod 418 to resiliently position arm 42" relative to arm 41" so that the angle between these two arms can vary slightly when forces acting on them by locator member 60" so require. In the same way, a pair of opposed springs in cylinder 420 acting on associated piston rod 422 positions arm 43" resiliently relative to arm 41" so that the angle between arms 41" and 43" can vary slightly when desired. Obviously arms 42" and 43" are thus resiliently positioned relative to one another. It will be seen that as the apparatus moves along guide line 39" a point will be reached where with the coupling member 43" rotatably connected to the outlet valve 35" as shown, coupling means 54" may require slight movement in the horizontal plane for alignment with the up-coming outlet valve 35", not shown. In such case piston rods 418 and 422 acting against each other through cylinders 416 and 420 and against arm 41" will permit resilient movement between water carrying arms 42" and 43" to thereby arrive at the desired positioning of coupling member 54" in relation to associated outlet valve 35".

In the light of the earlier described embodiments, it will be evident that water receiving manifold 45" in this modification moves along tracks 114" on carriage 112" as tractor 36" moves along guide line 38" with coupling member 53" coupled as shown to its associated riser outlet valve 35" and coupling 52" disconnected from and leaving its associated riser outlet valve 35". Carriage 112" reaches the end of its path of movement when water carrying arm 42" is normal to water main line 33" and then starts back toward its initial position as coupling member 54" approaches the next riser outlet valve 35". Counterweight 412 is moved by belt 404 to those positions where it will counterbalance the weight of water receiving manifold 45" and associated superstructure. Where desired, an electric motor 430 can assist movement of the belt, water receiving manifold 45" and counterweight 412.

Although not shown in the modification illustrated in FIGS. 17-19, in all embodiments water receiving manifolds 45, 45' and 45" can be maintained relatively stable and level against rolling and pitching of the conveyances 36, 36' and 36" by means of hydraulic cylinders such as those shown at 236 and 237 in FIGS. 1 and 3 and 236' and 237' of FIGS. 13 and 14. In the case of all embodiments, these hydraulic cylinders or their equivalents have their hydraulic fluid pressure controlled by instrumentation so as to resist to as great a degree as practicable departures of the superstructure, i.e., the water receiving manifold and rigid water flow pipes 47, 47' and 47" from an optimum position in which the pipes 47 are vertical. In any event, the hydraulic cylinders act to exert forces at all times tending to return rigid water flow pipes 47, 47' and 47" to the vertical following displacements occasioned by unevenness of the ground traversed by the conveyance.

Also in the modification of FIGS. 17-19 and the previously described embodiments, hydraulic cylinders 65, 65' and 65" support the water carrying arms in an extreme upper position while the arms are unattached to a riser such upper position being high enough to clear all obstacles in the path of rotation of the arms and at a height well above the height of outlet valves 35. In the other extreme position of the water carrying arms, with the piston rod of cylinder 65, 65' or 65" extended, each arm is supported at a height above the ground slightly less than the height of the outlet valve above the associated pad.

All the electronic and programming equipment needed for carrying out the described functions are well known in the art and therefore the specification and drawings have not been complicated by their inclusion.

Although three arms are shown fixed at 120° angular spacing and two arms at 180° angular spacing, two independently movable arms could be used with gearing or a power driven fluid drive acting between them so that as the 120° rotation of one arm around an outlet valve takes place a 240° rotation of the other arm will occur to thereby bring the other arm into regstry with the next riser. However, due to the considerable weight of the water in each arm, the three arms at 120° arrangement and the two arms at 180° arrangement are the preferred embodiments, the arms in such cases forming balanced structures.

The conveyance is shown on one side of the sprinkler line; however, the conveyance, i.e., the apparatus carrying the water receiving manifold and water carrying arms could be located at an intermediate point on the sprinkler line so long as the water main line is accessible to the water carrying arms.

Where in this specification and appended claims the verb "rotate" and its noun, adjective and adverb forms are used, they do not necessarily require complete or 360° rotation.

Where in the claims the terminology "not substantially less than" is used in respect to the length of a water carrying arm, the fact that the water receiving manifold or conduit junction pertinent dimension is included in the length of the water carrying arm is to be understood.

Where desired the downward force exerted by each water carrying arm can be utilized to open and close the connection between the coupling member and the associated water outlet valve means of the water main line instead of the means illustrated in FIGS. 12A, 12B, 12C and 12D.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

I claim as my invention:

1. For use in connection with a land irrigating system in which a moving water sprinkler means having water inlet means at one point extends laterally to and moves along the length dimension of a stationary water supply means having a plurality of water outlet valve means at equally spaced points along the length thereof, an apparatus for successively connecting water outlet valve means of the stationary water supply means with water inlet means of the sprinkler means comprising conveyance means for moving along the length dimension of the stationary water supply means at the same overall rate of movement as the moving sprinkler means, a plurality of elongated water conduit means each elongated water conduit means being rigid from one end portion to the other end portion, pivotal support means carried by the conveyance for pivotally supporting the plurality of elongated water conduit means by the conveyance means for rotation of each elongated water conduit means around one end portion of the elongated water conduit means, water flow conduit means connecting the one end portion of each elongated water conduit means for uninterrupted water flow to the inlet of the sprinkler line as the elongated water conduit means rotates, connecting means at the other end portion of each elongated water conduit means for rotational water flow connection with successive water outlet valve means, water flow control means for closing each elongated water conduit means, and movable support means for mounting the pivotal support means for movement in a straight line toward and away from the main line during movement of the conveyance means along the length dimension of the stationary water supply means to accommodate the length of an elongated water conduit means while an elongated water conduit means is connected to a water outlet valve means.

2. Apparatus as claimed in claim 1 including
power actuated means carried by the conveyance means for at least assisting in the rotation of the elongated water conduit means around the pivotal support means.

3. Apparatus as claimed in claim 1 including
power actuated means carried by the conveyance means for at least assisting in movement of the pivotal support means toward and away from the main line.

4. Apparatus as claimed in claim 3 including
power actuated means carried by the conveyance means for at least assisting in the rotation of the elongated water conduit means around the pivotal support means.

5. For use in connection with a land irrigating system in which a moving water sprinkler means having water inlet means at one point extends laterally to and moves along the length dimension of a stationary water supply means having a plurality of water outlet valve means at equally spaced points along the length thereof, an apparatus for successively connecting water outlet valve means of the stationary water supply means with water inlet means of the sprinkler means comprising conveyance means for moving along the length dimension of the stationary water supply means at the same overall rate of movement as the moving sprinkler means, a plurality of elongated water conduit means each rigid from one end portion to the other end portion, pivotal support means carried by the conveyance means for pivotally supporting the plurality of elongated water conduit means by the conveyance means for rotation of each elongated water conduit means around one end portion of the elongated water conduit means, waterflow conduit means connecting the one end portion of each elongated water conduit means for uninterrupted water flow from the one end portion of each elongated water conduit means to the inlet of the sprinkler line as the elongated water conduit means rotates, connecting means at the other end portion of each elongated water conduit means for rotational water flow connection with successive water outlet valve means, water flow control means for closing each elongated water conduit means, a trackway means on the conveyance means, a carriage means carried by the trackway means, the pivotal support means being supported by the carriage means for movement relative to the conveyance means toward and away from the main line during movement of the conveyance means along the length dimension of the stationary water supply means to accommodate the length of the elongated water conduit means while the elongated water conduit means is connnected to a water valve outlet means.

6. Apparatus as claimed in claim 5 including power actuated means carried by the conveyance means for at least assisting in the rotation of the elongated water conduit means around the pivotal support means.

7. Apparatus as claimed in claim 5 including power actuated means carried by the conveyance means for at least assisting in movement of the pivotal support means toward and away from the main line.

8. Apparatus as claimed in claim 7 including power actuated means carried by the conveyance means for at least assisting in the rotation of the elongated water conduit means around the pivotal support means.

9. For use in connection with a land irrigating system in which a moving water sprinkler means having water inlet means at one point extends laterally to and moves along the length dimension of a stationary water supply means having a plurality of water outlet valve means at equally spaced points along the length thereof, an apparatus for successively connecting water outlet valve means of the stationary water supply means with water inlet means of the sprinkler means comprising conveyance means for moving along the length dimension of the stationary water supply means at the same overall rate of movement as the moving sprinkler means, water receiving conduit junction means carried by the conveyance means having water outlet means and a plurality of water inlet means, a plurality of elongated water conduit means rigid from one end portion to the other end portion disposed radially relative to the water receiving conduit junction means, water outlet means associated with the end portion of each elongated water conduit means nearest to the water receiving conduit junction means connected for water flow to a water inlet means of the water receiving conduit junction means, connecting means associated with the other end portion of each elongated conduit means for successive water flow connection and disconnection with water outlet valve means on the stationary water supply means, water flow control means for closing each elongated water conduit means, pivotal support means supporting the water receiving conduit junction means and the elongated water conduit means for pivotal movement in a horizontal plane, pivotal water conduit means for connecting the water outlet means of the water receiving conduit junction means and the sprinkler means water inlet means for water flow from the water receiving conduit junction means to the sprinkler means water inlet means, and movable support means for mounting the pivotal support means for movement in a straight line toward and away from the main line during movement of the conveyance means along the length dimension of the stationary water supply means to accommodate the length of an elongated water conduit means while an elongated water conduit means is connected to a water valve outlet means.

10. For use in connection with a land irrigating system in which a moving water sprinkler means having water inlet means at one point extends laterally to and moves along the length dimension of a stationary water supply means having a plurality of water outlet valve means spaced along the length thereof, an apparatus for successively connecting water outlet valve means to the stationary water supply means with water inlet means of the sprinkler means comprising conveyance means for moving along the length dimension of the stationary water supply means at the same overall rate of movement as the moving sprinkler means, water receiving conduit junction means carried by the conveyance means having water outlet means and a plurality of water inlet means;

a plurality of elongated water conduit means rigid from one end portion to the other end portion disposed radially relative to the water receiving conduit junction means, water outlet means associated with the end portion of each elongated water conduit means nearest to the water receiving conduit junction means connected for water flow to a water inlet means of the water receiving conduit junction means, connecting means associated with the other end portion of each elongated conduit means for successive water flow connection and disconnection with water outlet valve means on the stationary water supply means, water flow control means for closing each elongated water conduit means, pivotal support means supporting the water receiving conduit junction means and the elongated water conduit means for rotation through 360° relative to the sprinkler means water inlet conduit, swivel water conduit means for pivotally connecting the water outlet means of the water receiving conduit junction means and the sprinkler means water inlet means for water flow from the water receiving conduit junction means to the sprinkler means water inlet means, and movable support means for mounting the pivotal support means for movement in a straight line toward and away from the main line during movement of the conveyance means along the length dimension of the stationary water supply means to accommodate the length of an elongated water conduit means while an elongated water conduit means is connected to one of said water outlet valve means.

11. The apparatus of claim 9 or 10 including power actuated means carried by the conveyance means for at least assisting in rotation of the water receiving conduit junction means and the elongated water conduit means.

12. Apparatus as claimed in claim 9 or 10 including
power actuated means carried by the conveyance means for at least assisting in the movement of the movable support means.

13. The apparatus of claim 9 or 10 including
locating means associated with the other end portion of each elongated water conduit means for positioning the associated connecting means contiguous to a water outlet valve means, and
 valve opening and closing means associated with the connecting means of each elongated water conduit means for opening and closing the associated water outlet valve means.

14. The apparatus of claim 13 wherein
there are three elongated water conduit means disposed in 120° and generally coplanar relation to one another around the water receiving conduit junction means.

15. The apparatus of claim 9 or 10 wherein
there are three elongated water conduit means disposed in 120° and generally coplanar relation to one another around the water receiving conduit junction means.

16. Apparatus as claimed in any one of claims 1-10 wherein
the conveyance means is a tractor with ground engaging means for moving the tractor, and includes
means for supporting the water receiving conduit junction means and associated elongated water conduit means from below by the tractor.

17. Apparatus as claimed in any one of claims 1-10 wherein
the conveyance means is an extension of the moving water sprinkler means, and includes
means for supporting the water receiving conduit junction means and associated elongated water conduit means from above by the conveyance means.

18. For use in connection with a land irrigating system in which a moving water sprinkler means having water inlet means at one point extends laterally to and moves along the length dimension of a stationary water supply means having a plurality of water outlet valve means at equally spaced points along the length thereof, an apparatus for successively connecting water outlet valve means of the stationary water supply means with water inlet means of the sprinkler means comprising
conveyance means for moving along the length dimension of the stationary water supply means at the same overall rate of movement as the moving sprinkler means,
three elongated water conduit means radially disposed at 120° to each other, each elongated water conduit means being rigid from one end portion to the other end portion,
pivotal support means carried by the conveyance for pivotally supporting the elongated water conduit means by the conveyance means for rotation of each elongated water conduit means around one end portion of the elongated water conduit means,
water flow conduit means connecting the one end portion of each elongated water conduit means for uninterrupted water flow to the inlet of the sprinkler line as the elongated water conduit means rotates,
connecting means at the other end portion of each elongated water conduit means for rotational water flow connection with successive water outlet valve means,
water flow control means for closing each elongated water conduit means, and
movable support means for mounting the pivotal support means for movement toward and away from the stationary water supply means during movement of the conveyance means along the length dimension of the stationary water supply means to accommodate the length of an elongated water conduit means while an elongated water conduit means is connected to one of said water outlet valve means.

19. Apparatus as claimed in claim 18 including
power actuated means carried by the conveyance means for at least assisting in the rotation of the elongated water conduit means around the pivotal support means.

20. Apparatus as claimed in claim 18 including
power actuated means carried by the conveyance means for at least assisting in movement of the pivotal support means toward and away from the main line.

21. Apparatus as claimed in claim 20 including
power actuated means carried by the conveyance means for at least assisting in the rotation of the elongated water conduit means around the pivotal support means.

22. For use in connection with a land irrigating system in which a moving water sprinkler means having water inlet means at one point extends laterally to and moves along the length dimension of a stationary water supply means having a plurality of water outlet valve means at equally spaced points in linear alignment along the length thereof, an apparatus for successively connecting water outlet valve means of the stationary water supply means with water inlet means of the sprinkler means comprising
conveyance means for moving along the length dimension of the stationary water supply means at the same overall rate of movement as the moving sprinkler means,
two elongated water conduit means radially disposed at 180° to each other, each elongated water conduit means being rigid from one end portion to the other end portion,
pivotal support means carried by the conveyance for pivotally supporting the elongated water conduit means by the conveyance means for 360° rotation of each elongated water conduit means around one end portion of the elongated water conduit means,
water flow conduit means connecting the one end portion of each elongated water conduit means for uninterrupted water flow to the inlet of the sprinkler line as the elongated water conduit means rotates,
connecting means at the other end portion of each elongated water conduit means for rotational water flow connection with successive water outlet valve means,
water flow control means for closing each elongated water conduit means, and
movable support means for mounting the pivotal support means for movement toward and away from the stationary water supply means during movement of the conveyance means along the length dimension of the stationary water supply means to accommodate the length of an elongated water conduit means while an elongated water conduit means is connected to a water valve outlet means, the pivotal support means being in linear alignment with the plurality of water outlet valve means when both elongated water conduit means are in position for connection to water outlet valve means.

23. Apparatus as claimed in claim 22 including
power actuated means carried by the conveyance means for at least assisting in the rotation of the elongated water conduit means around the pivotal support means.

24. Apparatus as claimd in claim 22 including
power actuated means carried by the conveyance means for at least assisting in movement of the pivotal support means toward and away from the main line.

25. Apparatus as claimed in claim 24 including
power actuated mean carried by the conveyance means for at least assisting in the rotation of the elongated water conduit means around the pivotal support means.

26. Apparatus as claimed in any one of claims 1–10, 18, 19, 20, 21, 22, 23, 24 or 25 wherein
at least one elongated water conduit means include an extensible water flow conduit portion located between the one end portion and the connecting means at the other end portion.

27. For use in connection with a land irrigating system in which a moving water sprinkler means having water inlet means at one point extends laterally to and moves along the length dimension of a stationary water supply means having a plurality of water outlet valve means at equally spaced points along the length thereof, an apparatus for successively connecting water outlet valve means of the stationary water supply means with water inlet means of the sprinkler means comprising
conveyance means for moving along the length dimension of the stationary water supply means at the same overall rate of movement as the moving sprinkler means,
a plurality of elongated water conduit means each elongated water conduit means being rigid from one end portion to the other end portion,
pivotal support means for supporting each elongated water conduit means for rotation around one end portion of the elongated water conduit means,
water receiving conduit junction means connecting the one end portion of each elongated water conduit means for uninterrupted water flow to the water inlet means of the sprinkler line during rotation of the elongated water conduit means,
connecting means at the other end portion of each elongated water conduit means for water flow connection with and disconnection from successive water outlet valves,
water flow control means for opening each elongated water conduit means, and
valve means associated with each connecting means for acting between each connecting means and the associated water flow control means for bleeding off water pressure between the water flow control means and the associated water outlet valve means when the water flow control means and the water outlet valve means are closed but prior to disconnection of the connecting means.

28. In connection with land irrigation wherein a moving sprinkler means having a water inlet means at one point moves along the length of a stationary water supply means having a plurality of water outlet valve means at spaced intervals along the length thereof, the method of successively connecting water outlet valve means of the stationary water supply means with water inlet means of the sprinkler means to obtain substantially continuous water supply to the sprinkler means comprising
moving a conveyance means along the length dimension of the stationary water supply means, the conveyance means carrying a water receiving conduit junction means having water outlet means rotatably connected to the water inlet means of the sprinkler means, the water receiving conduit junction means also having a plurality of water inlet means; and elongated water conduit means, each elongated water conduit means having water outlet means at one end portion connected to the water inlet means of the water receiving conduit junction means; water flow control means for opening and closing each elongated conduit means; and each elongated water conduit means having a connecting means at the other end portion for successive water flow connection and disconnection with the water outlet valve means on the stationary water supply means,
rotating the water receiving conduit junction means and the elongated water conduit means through an arc of 120° relative to the water inlet means of the sprinkler means to bring the connecting means of a first elongated conduit means into contiguity with a first water outlet valve means of the stationary water supply means while maintaining the connecting means of a second elongated water conduit means connected for water flow to the water outlet valve means of the stationary water supply means next adjacent to the first water outlet valve means in the direction opposite to the direction of movement of the conveyance means along the length of the stationary water supply means,
rotatably connecting the connecting means of the first elongated conduit means and the first water outlet valve means for water flow and subsequently closing the water flow control means of and disconnecting the connecting means of the second elongated conduit means from the second water outlet valve means to stop water flow through the second elongated water conduit,
moving a third connecting means of a third elongated water conduit means through an arc of 120° into contiguity with a third water outlet valve means next adjacent to the first water outlet valve means in the direction of movement of the conveyance means along the length of the stationary water supply means, and
rotatably connecting the third connecting means of the third elongated conduit means and the third water outlet valve means for water flow and subsequently closing the water flow control means of and disconnecting the connecting means of the first elongated coupling means from the first water outlet valve to stop water flow through the first elongated water conduit means.

29. In connection with land irrigation wherein a moving sprinkler means having a water inlet means at one point moves along the length of a stationary water supply means having a plurality of water outlet valve means disposed at spaced intervals and in linear alignment along the length thereof, the method of successively connecting water outlet valve means of the stationary water supply means with water inlet means of the sprinkler means to obtain substantially continuous water supply to the sprinkler means comprising moving a conveyance means along the length dimension of the stationary water supply means, the conveyance means carrying a water receiving conduit junction means having water outlet means rotatably connected to the water inlet means of the sprinkler means, the water receiving conduit junction means also having a plurality of water inlet means; and elongated water conduit means, each elongated water conduit means having water outlet means at one end portion connected to the water inlet means of the water receiving conduit junction means; water flow control means for opening and closing each elongated conduit means; and each elongated water conduit means having a connecting means at the other end portion for successive water flow connection and disconnection with the water outlet valve means on the stationary water supply means, rotating the water receiving conduit junction means and the elongated water conduit means through an arc of 180° relative to the water inlet means of the sprinkler means to bring the connecting means of a first elongated conduit means into contiguity with a first water outlet valve means of the stationary water supply means while maintaining the connecting means of a second elongated water conduit means connected for water flow to the water outlet valve means of the stationary water supply means next adjacent to the first water outlet valve means in the direction opposite to the direction of movement of the conveyance means along the length of the stationary water supply means, rotatably connecting the connecting means of the first elongated conduit means and the first water outlet valve means for water flow and subsequently closing the water flow control means of and disconnecting the connecting means of the second elongated conduit means from the second water outlet valve means to stop water flow through the second elongated water conduit, moving the connecting means of the second elongated water conduit means through an arc or 180° into contiguity with a third water outlet valve means next adjacent to the first water outlet valve means in the direction of movement of the conveyance means along the length of the stationary water supply means, and rotatably connecting the connecting means of the second elongated conduit means and the third water outlet valve means for water flow and subsequently closing the water flow control means of and disconnecting the connecting means of the first elongated coupling means from the first water outlet valve to stop water flow through the first elongated water conduit means, the water receiving conduit junction means being positioned in linear alignment with the plurality of water outlet valve means when both elongated water conduit means connecting means are in position to be connected to water outlet valves and being moved to a point spaced from the stationary water supply means in the same direction each time the elongated conduit means are rotated, thereby accommodating the elongated conduit means during movement of the conveyance along the stationary water supply means.

30. The method of claim 28 or 29 wherein subsequently to closing the water flow control means of an elongated water conduit means and the associated water outlet valve means of the stationary water supply means and prior to disconnecting the connecting means of such elongated water conduit means, water pressure in the still connected connecting means between the water flow control means and the associated water outlet means is gradually released to avoid water pressure damage to the water outlet valve means.

* * * * *